United States Patent
Martin et al.

(10) Patent No.: US 11,769,223 B2
(45) Date of Patent: Sep. 26, 2023

(54) LOCAL TILE-BASED REGISTRATION AND GLOBAL PLACEMENT FOR STITCHING

(71) Applicant: Ventana Medical Systems, Inc., Tucson, AZ (US)

(72) Inventors: Jim Martin, Mountain View, CA (US); Anindya Sarkar, Milpitas, CA (US)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 0 days.

(21) Appl. No.: 16/599,449

(22) Filed: Oct. 11, 2019

(65) Prior Publication Data
US 2020/0043134 A1 Feb. 6, 2020

Related U.S. Application Data

(63) Continuation of application No. PCT/EP2018/058807, filed on Apr. 6, 2018.

(60) Provisional application No. 62/485,818, filed on Apr. 14, 2017.

(51) Int. Cl.
G06T 3/40 (2006.01)
G06T 7/32 (2017.01)
G06T 7/38 (2017.01)

(52) U.S. Cl.
CPC .............. G06T 3/4038 (2013.01); G06T 7/32 (2017.01); G06T 7/38 (2017.01); G06T 2207/10056 (2013.01); G06T 2207/30024 (2013.01)

(58) Field of Classification Search
CPC combination set(s) only.
See application file for complete search history.

(56) References Cited

U.S. PATENT DOCUMENTS

| 5,650,327 | A | 7/1997 | Copeland et al. |
| 5,654,200 | A | 8/1997 | Copeland et al. |
| 6,296,809 | B1 | 10/2001 | Richards et al. |
| 6,352,861 | B1 | 3/2002 | Copeland et al. |
| 6,827,901 | B2 | 12/2004 | Copeland et al. |

(Continued)

FOREIGN PATENT DOCUMENTS

| CA | 2323463 A1 | 5/1996 | |
| CN | 103679636 | * 3/2014 | ............... G06T 3/40 |

(Continued)

OTHER PUBLICATIONS

International Search Report and Written Opinion dated Jun. 18, 2018 in related foreign application No. PCT/EP2018/058807, all pgs.

(Continued)

*Primary Examiner* — Zhiyu Lu
(74) *Attorney, Agent, or Firm* — Kilpatrick Townsend & Stockton LLP

(57) ABSTRACT

Techniques are provided for stitching tile images. A local registration can be performed to determine spatial relationships between pairs of adjacent tile images, in which the spatial relationships may be determined using normalized cross correlation (NCC) scores computed within a multi-resolution framework. A global placement can be performed to position all scanned tile images relative to one another. The global placement is determined with weighted least squares utilizing the determined spatial relationships between all adjacent greyscale tile images and the NCC scores as weights.

20 Claims, 10 Drawing Sheets

(56) References Cited

U.S. PATENT DOCUMENTS

| | | |
|---|---|---|
| 6,943,029 B2 | 9/2005 | Copeland et al. |
| 7,095,905 B1* | 8/2006 | Peterson ............ H04N 5/23238 |
| | | 382/284 |
| 8,731,260 B2 | 5/2014 | Crandall et al. |
| 2002/0181802 A1* | 12/2002 | Peterson ................. G06T 3/005 |
| | | 382/284 |
| 2003/0211630 A1 | 11/2003 | Richards et al. |
| 2004/0052685 A1 | 3/2004 | Richards et al. |
| 2004/0181747 A1* | 9/2004 | Hull ...................... G06F 3/1285 |
| | | 715/255 |
| 2006/0247863 A1* | 11/2006 | Bui ..................... H01J 49/0004 |
| | | 382/128 |
| 2006/0257051 A1* | 11/2006 | Zavadsky ............. G06T 3/4038 |
| | | 382/294 |
| 2006/0291747 A1* | 12/2006 | Peterson ............ H04N 5/23238 |
| | | 382/284 |
| 2010/0014780 A1* | 1/2010 | Kalayeh .................. G06T 5/002 |
| | | 382/284 |
| 2011/0115896 A1* | 5/2011 | Doehring ............... H04N 7/183 |
| | | 382/128 |
| 2012/0312957 A1 | 12/2012 | Loney et al. |
| 2013/0028472 A1* | 1/2013 | Pham ....................... G06T 7/32 |
| | | 382/218 |
| 2013/0063585 A1* | 3/2013 | Watanabe .............. G02B 21/16 |
| | | 348/79 |
| 2013/0243352 A1* | 9/2013 | Khurd .................... G06T 11/60 |
| | | 382/284 |
| 2013/0278779 A1 | 10/2013 | Hong |
| 2014/0355892 A1 | 12/2014 | Moon et al. |
| 2016/0140746 A1 | 5/2016 | Ranft et al. |
| 2018/0012355 A1 | 1/2018 | Sarkar et al. |
| 2020/0043134 A1 | 2/2020 | Martin et al. |

FOREIGN PATENT DOCUMENTS

| | | | |
|---|---|---|---|
| JP | 2000348159 A | 12/2000 | |
| JP | 2004184240 A | 7/2004 | |
| JP | 2012242613 | * 12/2012 | ............... G02B 7/28 |
| WO | 2011049608 A2 | 4/2011 | |
| WO | 2016120463 A1 | 8/2016 | |

OTHER PUBLICATIONS

International Preliminary Report on Patentability dated Oct. 15, 2019 in related foreign application No. PCT/EP2018/058807, all pgs.

Kevin Loewke, et al.: "Deformable Image Mosaicing for Optical Biopsy", ICCV2007. IEEE 11th International Conference on Computer Vision, 2007, IEEE, Oct. 1, 2007 (Oct. 1, 2007 ), pp. 1-8.

Lisa Gottesfeld Brown: "A Survey of Image Registration Techniques", ACM Computing Surveys, vol. 24, No. 4, Dec. 1, 1992 (Dec. 1, 1992 ), pp. 325-376.

Richard Szeliski: "Image Alignment and Stitching: A Tutorial", Foundations and Trends In Computer Graphics and Vision, vol. 2, No. 1, Jan. 1, 2006 (Jan. 1, 2006), pp. 1-104.

J P Lewis: "Fast Normalized Cross-Correlation", Jan. 1, 1995 (Jan. 1, 1995 ), pp. 1-8, XP055482212, Retrieved from the Internet: URL:https://www.researchgate.net/profile/JP Lewis/publication/ 2378357- Fast-Normalized- Cross-Correlation/links/ 0046352c024d320ced000000/Fast-Normal Sized-Cross-Correlation. pdf.

M. Unser, A Aldroubi,and M. Eden, "The L2-Polynomial Spline Pyramid," IEEE Transactions on Patterns Analysis and Machine Intelligence, vol. 15, 364-379, Apr. 1993.

European Application No. EP18718118.5 received a Notice of Decision to Grant dated Sep. 2, 2021, 2 pages.

U.S. Appl. No. 61/533,114 , Imaging Systems Cassettes, and Methods of Using the Same, filed Sep. 9, 2011.

JP Application No. JP2019-555778 received an Office Action, dated Mar. 29, 2022, 8 pages.

Application No. JP2019-555778, Notice of Decision to Grant, dated Jul. 26, 2022, 6 pages (English translation pp. 1-3, original document pp. 4-6).

Application No. CN201880024039.3, Office Action, dated Jan. 28, 2023, 26 pages (pp. 1-12 English translation, pp. 13-22 original document).

Chinese Application No. 201880024039.3 , "Office Action", dated Jun. 10, 2023, 28 pages.

* cited by examiner

LOCAL TILE-BASED REGISTRATION AND GLOBAL PLACEMENT FOR STITCHING

CROSS REFERENCES TO RELATED APPLICATIONS

The present application is a continuation of International Application PCT/EP2018/058807, entitled "Local tile-based registration and global placement for stitching" and filed Apr. 6, 2018, which claims priority to U.S. Provisional Application No. 62/485,818, filed Apr. 14, 2017. Each of these applications is hereby incorporated by reference in its entirety for all purposes.

BACKGROUND

In recent years, there has been much interest in merging images of static scenes for applications in areas such as panorama imaging and mapping. The merging of images is also useful in the field of medical imaging, including the imaging of samples presented on a microscope slide. Traditionally, an image mosaic is created by stitching two or more overlapping images together to form a single larger composite image through a process involving registration, warping, re-sampling, and blending. The image registration step is used to find the relative geometric transformation among overlapping images.

Image registration based on features extracted from images is one approach for merging a plurality of images. The feature-based image registration determines a set of feature points in each image and then compares the corresponding feature descriptors. The number of feature points is usually much smaller than the number of pixels of a corresponding image. Feature-based image registration may not work well for certain image pairs under some circumstances and could result in registration errors.

SUMMARY

In one aspect of the present disclosure is a computer-implemented method of stitching tile images (e.g. including those derived from a specimen-bearing slide) comprising: (a) deriving a greyscale tile image for each scanned tile image; (b) performing a local registration to determine spatial relationships between pairs of adjacent greyscale tile images, the spatial relationships determined using normalized cross correlation (NCC) scores computed within a multi-resolution framework; and (c) performing a global placement to position all scanned tile images relative to one another, wherein the global placement is determined with weighted least squares utilizing the determined spatial relationships between all adjacent greyscale image tiles and the NCC scores as weights. In some embodiments, the method further comprises stitching together and blending all of the images based on the computed image tile placements. In some embodiments, the method further comprises performing a region of interest identification.

In some embodiments, the spatial relationship for each pair of adjacent greyscale tile images is determined by (i) computing candidate spatial relationships between prospective matching regions in first and second low resolution subsampled images, the first and second low resolution subsampled images derived from an overlapping region of an adjacent greyscale image tile pair; (ii) refining the candidate spatial relationships in sequentially finer resolution subsampled images; and (iii) selecting the refined candidate spatial relationship having a highest NCC score in the overlapping region of the adjacent greyscale image tile pair at an original resolution as the determined spatial relationship.

In some embodiments, the candidate spatial relationships between the first and second low resolution subsampled images are derived by determining locations of peaks in a NCC domain in the first and second low resolution subsampled images. In some embodiments, candidate spatial relationships are retained whose peak locations meet a predefined NCC threshold. In some embodiments, the predefined NCC threshold is a predefined percentage of a top NCC score (e.g. within 90% of the top NCC score). In some embodiments, each subsampled image is a cropped image derived from one greyscale image of the pair of adjacent greyscale image tile pairs. In some embodiments, the method further comprises the step of calculating a standard deviation between matching regions in the adjacent greyscale tile image pairs.

In some embodiments, the candidate spatial relationships are refined by determining updated locations of each peak in the NCC domain, wherein the updating of the locations of each peak is performed within pairs of sequentially finer resolution subsampled images, each pair of sequentially finer resolution subsampled images corresponding to the overlapping region of the adjacent greyscale image tile pair. In some embodiments, each pair of sequentially finer resolution subsampled images comprises a predetermined reduction in a down sampling factor as compared with the immediately lower resolution subsampled image until a down sampling factor of 1 is reached. In some embodiments, a change in the down sampling factor ranges from 2 to 4. In some embodiments, the first and second subsampled images have a first down sampling factor to provide a first resolution; and wherein a first pair of sequentially finer resolution subsampled images has a resolution which is twice the resolution of the first resolution.

In some embodiments, the NCC scores are computed using integral images for all subsampled image resolutions. In some embodiments, the NCC scores are computed using integral images for at least one subsampled image resolution.

In some embodiments, the spatial relationships between adjacent greyscale image tiles are tile overlap and tile shift. In some embodiments, tile shift and tile overlap values are computed for all horizontal image tile pairs and all vertical image tile pairs. In some embodiments, the method further comprises determining whether the tile overlap and tile shift values between adjacent greyscale image tile pairs are reliable (e.g. whether the overlapping regions (i) do not have sufficient matched pixels, or (ii) do not comprise sufficient high contrast areas). In some embodiments, the determining of whether the tile overlap and tile shift values are reliable comprises comparing a standard deviation derived from matching regions in the adjacent greyscale tile image pairs to a standard deviation threshold, wherein the tile overlap and tile shift values are unreliable if the standard deviation is below the standard deviation threshold. In some embodiments, and in the context of matching tiles derived from specimen-bearing slides, the matching is reliable when there is a certain overlapping region between the images and the overlapping region is not fully whitespace and has some non-glass region. Using a certain threshold on the standard deviation makes it possible to identify where the matching region is purely whitespace based, and where the matching region has some non-white space regions.

In some embodiments, if the tile overlap and tile shift values are determined to be unreliable either (i) assigning average overlap and average shift values as tile overlap and tile shift values, respectively, or (ii) assigning lower confidence scores to those unreliable adjacent greyscale image tiles. In some embodiments, an average overlap value and an average shift value are assigned as tile overlap and tile shift values, respectively, for left-right image tiles. In some embodiments, the lower confidence scores are assigned to unreliable top-bottom image tiles. In some embodiments, unreliable image tile pairs comprise substantially white space, at least within prospective overlapping regions.

In some embodiments, the spatial relationships comprise tile overlaps and tile shifts, where for a left-right image tile pair, tile overlap is derived for overlap along an x-axis between a left tile of the left-right image tile pair and a right tile of the left-right image pair; and where a tile shift is derived for shift along a y-axis between the left-right image tile pair. In some embodiments, if the tile shift has a positive value, the right tile should be shifted downward such that it aligns with the right tile.

In some embodiments, the spatial relationships comprise tile overlaps and tile shifts, where for a top-bottom image tile pair, tile overlap is derived for overlap along a y-axis between a top image of the top-bottom image tile pair and a bottom image of the top-bottom image tile pair; and where a tile shift is derived for shift along an x-axis between the top-bottom image tile pair. In some embodiments, if the tile shift has a positive value, the top tile should be shifted right such that it aligns with the bottom tile.

In another aspect of the present disclosure is a computer-implemented method of stitching image tiles comprising: (a) running a local registration module to identify matching pixels in overlapping regions of adjacent tile images, wherein the local registration is expressed as a spatial relationship which yields the best normalized cross correlation score in overlapping regions of the adjacent tile images, the normalized cross correlation (NCC) scores being computed within a multi-resolution framework; and (b) running a global placement module to position all image tiles relative to one another.

In another aspect of the present disclosure is a computer-implemented method of determining spatial relationships between at least two adjacent images comprising (i) computing candidate spatial relationships between prospective matching regions in first and second low resolution subsampled images, the first and second low resolution subsampled images derived from an overlapping region of an adjacent image tile pair in a NCC domain; (ii) refining the candidate spatial relationships in sequentially finer resolution subsampled images (again in the NCC domain); and (iii) selecting the refined candidate spatial relationship having a highest NCC score in the overlapping region of the adjacent greyscale image tile pair at an original resolution as the determined spatial relationship. In some embodiments, the method further comprises performing a global placement step to place all the images on the same grid, the global placement step utilizing the determined spatial relationships and derived NCC scores in a weighted least squares solver.

In another aspect of the present disclosure is a computer-implemented method of placing image tiles on a grid relative to one another such that a substantially artifact-free mosaic is created after stitching, the method comprising deriving spatial relationships between all image tiles, and using a weighted least squares solution to place the images based on the derived spatial relationships and on derived NCC scores, the NCC scores being the weights for the weighted least squares solution. In some embodiments, the derived spatial relationships are computed using a local registration module, described herein. In other embodiments, the derived spatial relationships have been pre-computed and supplied as tile overlap and tile shift data, along with corresponding NCC scores.

In another aspect of the present disclosure is a computing device configured to stitch image tiles comprising one or more processors and at least one memory, the at least one memory storing non-transitory computer-readable instructions for execution by the one or more processors to cause the one or more processors to execute instructions to: (a) derive a greyscale tile image for each scanned tile image; (b) perform a local registration to determine spatial relationships between pairs of adjacent greyscale tile images, the spatial relationships determined using normalized cross correlation scores computed within a multi-resolution framework; and (c) perform a global placement to position all scanned tile images relative to one another, wherein the global placement is determined with weighted least squares utilizing the determined spatial relationships between all adjacent greyscale image tiles and the NCC scores as weights.

In some embodiments, the spatial relationship for each pair of adjacent greyscale tile images is determined by (i) computing candidate spatial relationships between prospective matching regions in first and second low resolution subsampled images, the first and second low resolution subsampled images derived from an overlapping region of an adjacent greyscale image tile pair; (ii) refining the candidate spatial relationships in sequentially finer resolution subsampled images; and (iii) selecting the refined candidate spatial relationship having a highest NCC score in the overlapping region of the adjacent greyscale image tile pair at an original resolution as the determined spatial relationship. In some embodiments, the candidate spatial relationships between the first and second low resolution subsampled images are derived by determining locations of peaks in a NCC domain in the first and second low resolution subsampled images.

In some embodiments, the candidate spatial relationships are refined by determining updated locations of each peak in the NCC domain, wherein the updating of the locations of each peak is performed within pairs of sequentially finer resolution subsampled images, each pair of sequentially finer resolution subsampled images corresponding to the overlapping region of the adjacent greyscale image tile pair. In some embodiments, each pair of sequentially finer resolution subsampled images comprises a predetermined reduction in a down sampling factor as compared with the immediately lower resolution subsampled image until a down sampling factor of 1 is reached.

In some embodiments, the NCC scores are computed using integral images for all subsampled image resolutions. In some embodiments, the NCC scores are computing using integral images for at least one subsampled image resolution.

In some embodiments, the spatial relationships between adjacent greyscale image tiles are tile overlap and tile shift. In some embodiments, tile shift and tile overlap values are computed for all horizontal image tile pairs and all vertical image tile pairs. In some embodiments, the device further comprises providing instructions to determine whether the tile overlap and tile shift values between adjacent greyscale image tile pairs are reliable. In some embodiments, determining of whether the tile overlap and tile shift values are reliable comprises comparing a standard deviation derived from matching regions in the adjacent greyscale tile image pairs to a standard deviation threshold, wherein the tile overlap and tile shift values are unreliable if the standard deviation is below the standard deviation threshold. In some embodiments, if the tile overlap and tile shift values are determined to be unreliable either (i) assigning average overlap and average shift values as tile overlap and tile shift values, respectively, or (ii) assigning lower confidence scores to those unreliable adjacent greyscale image tiles.

In another aspect of the present disclosure is a non-transitory computer-usable medium embodying computer program code, the computer program code comprising computer executable instructions configured to: (a) derive a greyscale tile image for each scanned tile image; (b) perform a local registration to determine spatial relationships between pairs of adjacent greyscale tile images, the spatial relationships determined using normalized cross correlation scores computed within a multi-resolution framework; and (c) perform a global placement to position all scanned tile images relative to one another, wherein the global placement is determined with weighted least squares utilizing the determined spatial relationships between all adjacent greyscale image tiles and the NCC scores as weights. In some embodiments, the spatial relationship for each pair of adjacent greyscale tile images is determined by (i) computing candidate spatial relationships between prospective matching regions in first and second low resolution subsampled images, the first and second low resolution subsampled images derived from an overlapping region of an adjacent greyscale image tile pair; (ii) refining the candidate spatial relationships in sequentially finer resolution subsampled images; and (iii) selecting the refined candidate spatial relationship having a highest NCC score in the overlapping region of the adjacent greyscale image tile pair at an original resolution as the determined spatial relationship.

In another aspect of the present disclosure is a non-transient computer readable storage medium comprising executable instructions to: (a) derive a greyscale tile image for each scanned tile image; (b) perform a local registration to determine spatial relationships between pairs of adjacent greyscale tile images, the spatial relationships determined using normalized cross correlation scores computed within a multi-resolution framework; and (c) perform a global placement to position all scanned tile images relative to one another, wherein the global placement is determined with weighted least squares utilizing the determined spatial relationships between all adjacent greyscale image tiles and the NCC scores as weights. In some embodiments, the spatial relationship for each pair of adjacent greyscale tile images is determined by (i) computing candidate spatial relationships between prospective matching regions in first and second low resolution subsampled images, the first and second low resolution subsampled images derived from an overlapping region of an adjacent greyscale image tile pair; (ii) refining the candidate spatial relationships in sequentially finer resolution subsampled images; and (iii) selecting the refined candidate spatial relationship having a highest NCC score in the overlapping region of the adjacent greyscale image tile pair at an original resolution as the determined spatial relationship.

In another aspect of the present disclosure is an image registration and placement method that utilizes all of the pixels in prospective overlapping regions of adjacent images. The "full search" methodology disclosed herein may allow for the detection of subtle differences between similar regions of adjacent images which could otherwise be missed using a "feature based" methodology. As such, aspects of the present disclosure provides an advantageous method of registering and placing images, while all doing so with a low computing cost.

BRIEF DESCRIPTION OF THE DRAWINGS

Non-limiting and non-exhaustive embodiments are described with reference to the following drawings. The same reference numerals refer to like parts or acts throughout the various views, unless otherwise specified.

DETAILED DESCRIPTION

Figure 1:
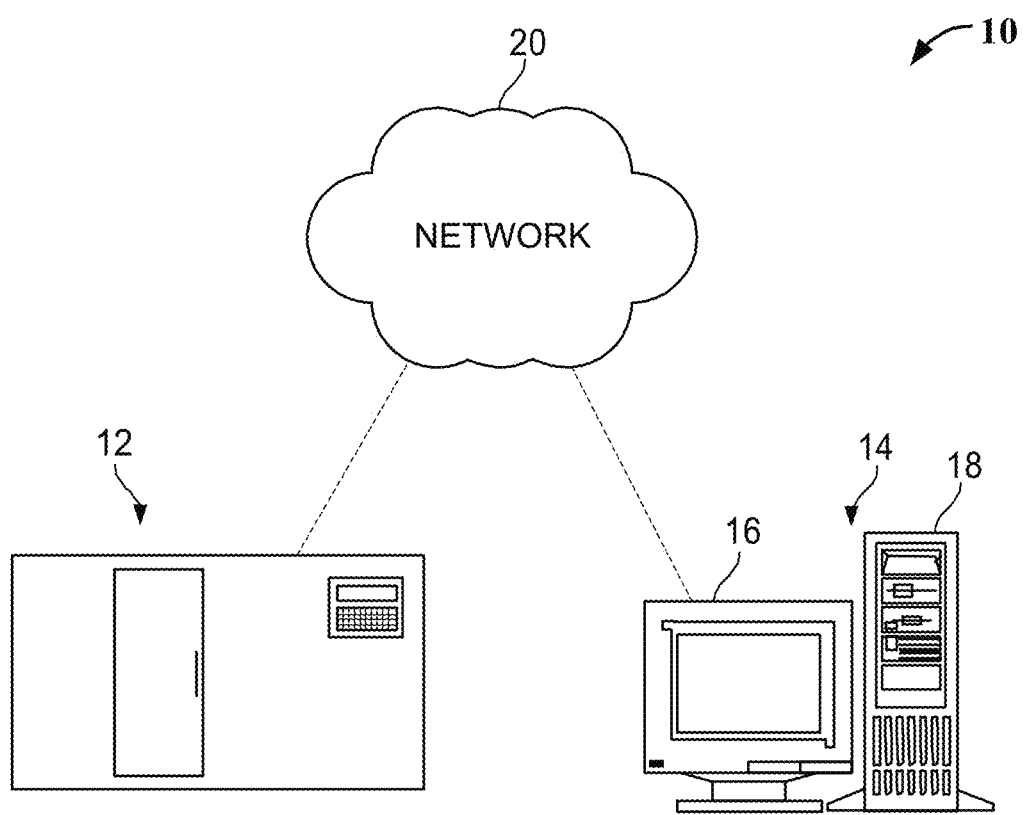
FIG. 1 illustrates a computer system for processing digital images of a tissue sample for analysis, in accordance with some embodiments.

For a general understanding of the features of the disclosure, reference is made to the drawings. In the drawings, like reference numerals have been used throughout to identify identical elements. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein, the terms "combining" or "stitching," used in the context of multiple images, refer to substantially seamlessly joining two images having some finite overlap region. The words "fuse" or "fusing" are used synonymously to refer to the stitching process. In some embodiments, two images are joined at a time, although more images can be joined by repeating the process.

As used herein, the term "image registration" refers, in general, to the process of transforming one or more images into a coordinate system of a reference image.

As used herein, the term "pixel" refers to the smallest segment into which an image can be divided. Received pixels of an input image may be associated with a value defined in terms of intensity, lightness, brightness, or some mathematical transformation thereof.

As used herein, the term "template" refers to an area (region) defined within an image. In the context of image stitching, the template typically includes part or all of a region within an overlapping area of two images to be stitched. As part of the image stitching method, a template selected from a first window, the "template window" is matched with a second window, the "target window," by searching in the target window for the most similar image to the template. The template window and the target window typically include a common area or "overlap region" where the first and second images overlap each other.

As used herein, the term "tile" refers to a single image corresponding to a portion of a whole image, or a whole slide. In some embodiments, "tile" refers to a region of a whole slide scan or an area of interest having (x,y) pixel dimensions (e.g. 300 pixels by 300 pixels). For example, consider a whole image split into M columns of tiles and N rows of tiles, where each tile within the M×N mosaic comprises a portion of the whole image, i.e. a tile at location M1,N1 comprises a first portion of an image, while a tile at location M3,N4 comprises a second portion of the image, the first and second portions being different. In some embodiments, the tiles may each have the same dimensions (pixel size by pixel size).

As used herein, the term "white space" refers to regions of a scanned microscope slide where there is no tissue but only glass. At these locations, the scanned image will appear "white" at regions corresponding to the glass. Indeed, the intensity value for the glass regions will correspond to the white point setting for the scan. For example, if the white point is set at 250, then the glass regions will have a pixel intensity value of 250.

Overview

Figure 9A:
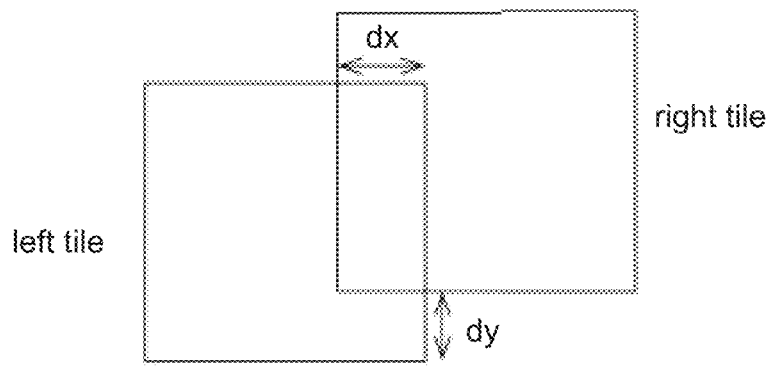
FIGS. 9A and 9B illustrate tile overlap and tile shift between left-right and top-bottom image tile pairs, in accordance with some embodiments.
Figure 9B:
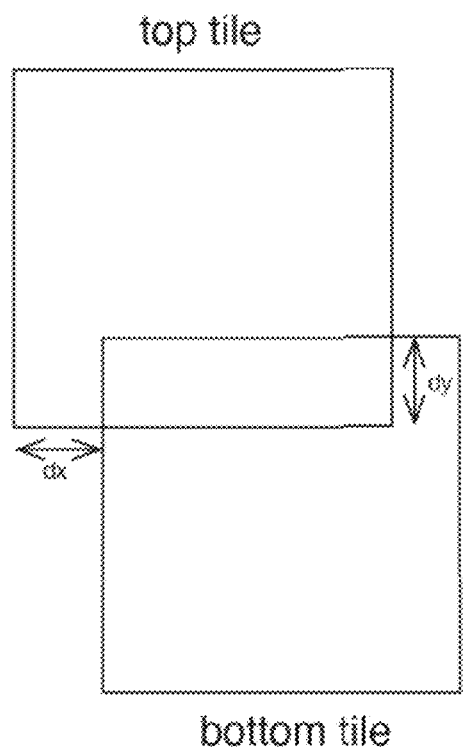

The present disclosure is directed to a method of stitching images together based on derived spatial relationships between adjacent image tile pairs, e.g. overlap and shift of tiles both in the x and y directions (see FIGS. 9A and 9B). In arriving at a local registration solution, the present disclosure compares all pixels in prospective overlapping regions of adjacent image tile pairs. To ensure that the spatial relationships may be computed without compromising on runtimes, the methods disclosed herein employ a multi-resolution framework, where the cost function which is used between adjacent image tile pairs is the normalized cross correlation score between the greyscale representations of the prospective common regions between the two images of the pair. In addition, the methods disclosed herein further utilize integral images so that suitable moments can be pre-computed, such that the normalized cross correlation peaks may be found in reduced time. Accordingly, normalized cross correlation scores for all prospective common regions between adjacent tile images can be "quickly" computed by using precomputed values of first and second moments of the two images. Finally, once the spatial relationships are derived, the spatial relationships and normalized cross correlation scores (i.e. confidence values) may be used together in a global weighted least squares solver so that the best locations for all tiles can be determined and placed on the same grid, enabling a reduction in stitching artifact errors especially in regions which do not comprise much data.

While some exemplary embodiments disclosed herein make reference to stitching together images acquired from a microscope slide scanner, the skilled artisan will appreciate that the procedures described herein may be adapted more generally, and thus may be applied to stitch together images from any source (e.g. any image capture means, including digital cameras). As such, while specific embodiments may disclose the computation of certain values (e.g. image tile overlap and shift values, standard deviation values, normalized cross correlation scores) in the context of image tiles captured of a specimen-bearing microscope slide, the procedures described herein may be used to compute those values from any series of image tiles, regardless of source. Moreover, while some specific examples may refer to a particular microscope slide scanner which scans slides according to a specific process (e.g. acquire image tiles down a first column, shift right, acquire image tiles up a second column, shift right, and so on), these specific examples are for illustrative purposes only and are not intended to limit the disclosure (e.g. a scanner may be employed that scans in an opposite direction or in an entirely different directions or patterns of scanning, and the skilled artisan will be able to apply the techniques disclosed herein to those specific types of scanners or their modes of operation).

Digital Pathology Systems

A computer-based specimen analyzer 10 for analyzing specimens is illustrated in FIG. 1. The computer-based specimen analyzer 10 may comprise an imaging apparatus 12 (e.g. an apparatus having means for scanning a specimen-bearing microscope slide) and a computer 14, whereby the imaging apparatus 12 and computer may be communicatively coupled together (e.g. directly, or indirectly over a network 20). The skilled artisan will appreciate that other computer devices or systems may be utilized and that the computer systems described herein may be communicatively coupled to additional components, e.g. specimen analyzers, microscopes, or imaging systems, automated slide preparation equipment, etc. Some of these additional components and the various computers that may be utilized are described further herein.

In general, the imaging apparatus 12 (or other image source including pre-scanned images stored in a memory) can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. An image sensor, for example, a CCD sensor can capture a digital image of the specimen. In some embodiments, the imaging apparatus 12 is a brightfield imaging system, a multispectral imaging (MSI) system or a fluorescent microscopy system. The digitized tissue data may be generated, for example, by an iSCAN COREO™ by VENTANA MEDICAL SYSTEMS of Tucson, Ariz. or other suitable imaging equipment. Additional imaging devices and systems are described further herein.

Figure 2:
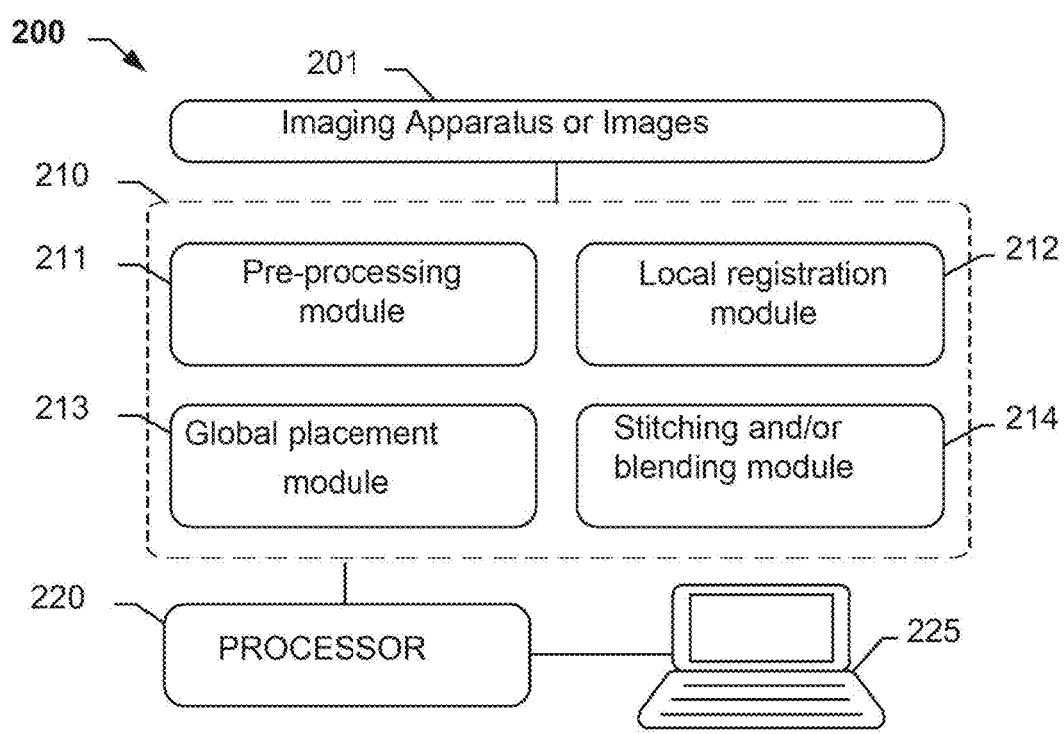
FIG. 2 provides a flowchart outlining modules used in the processing of digital images for analysis, in accordance with some embodiments.

With reference to FIGS. 1 and 2, the computer system 14 can include a desktop computer, a laptop computer, a tablet, or the like, digital electronic circuitry, firmware, hardware, memory 210, a computer storage medium 210, a computer program (e.g. where the program is stored within the memory or storage medium), a processor 220 (including a programmed processor), and/or the like. The computing system 14 illustrated in FIG. 1 may comprise a computer with a display device 16 and an enclosure 18. The computer system can store digital images in binary form (locally, on a server, or another network connected device). The digital images can also be divided into a matrix of pixels. The pixels can include a digital value of one or more bits, defined by the bit depth.

Again, with reference to FIG. 1, the network 20, in some embodiments, interconnects the imaging apparatus 12 and the computer system 14. The network 20 may include, without limitation, one or more gateways, routers, bridges, combinations thereof, or the like. The network 20 may include one or more servers and one or more web sites that are accessible to users and can be used to send and receive information that the computer system 14 can utilize. A server may include, without limitation, one or more associated databases for storing information (e.g., digital images, algorithms, staining protocols, cutoff values for comparative evaluations, or the like). The network 20 may include, but is not limited to, data networks using the Transmission Control Protocol (TCP), User Datagram Protocol (UDP), Internet Protocol (IP) and other data protocols. In some embodiments, the computer device or system further comprises a display output or other means of providing data/output to a user, operator, or downstream instrument or process.

FIG. 2 provides an overview of the various modules utilized within the presently disclosed workflow. In some embodiments, the computer device 14 or computer-implemented method comprises one or more processors 220 and at least one memory 210, the at least one memory 210 storing non-transitory computer-readable instructions for execution by the one or more processors to cause the one or more processors to execute instructions in one or more modules (e.g. modules 211 through 214). Alternatively, the instructions may be stored in a non-transitory computer-readable medium (210) or computer-usable medium. In some embodiments, a non-transitory computer-readable media may comprise all computer-readable media except for a transitory, propagating signal.

Figure 3:
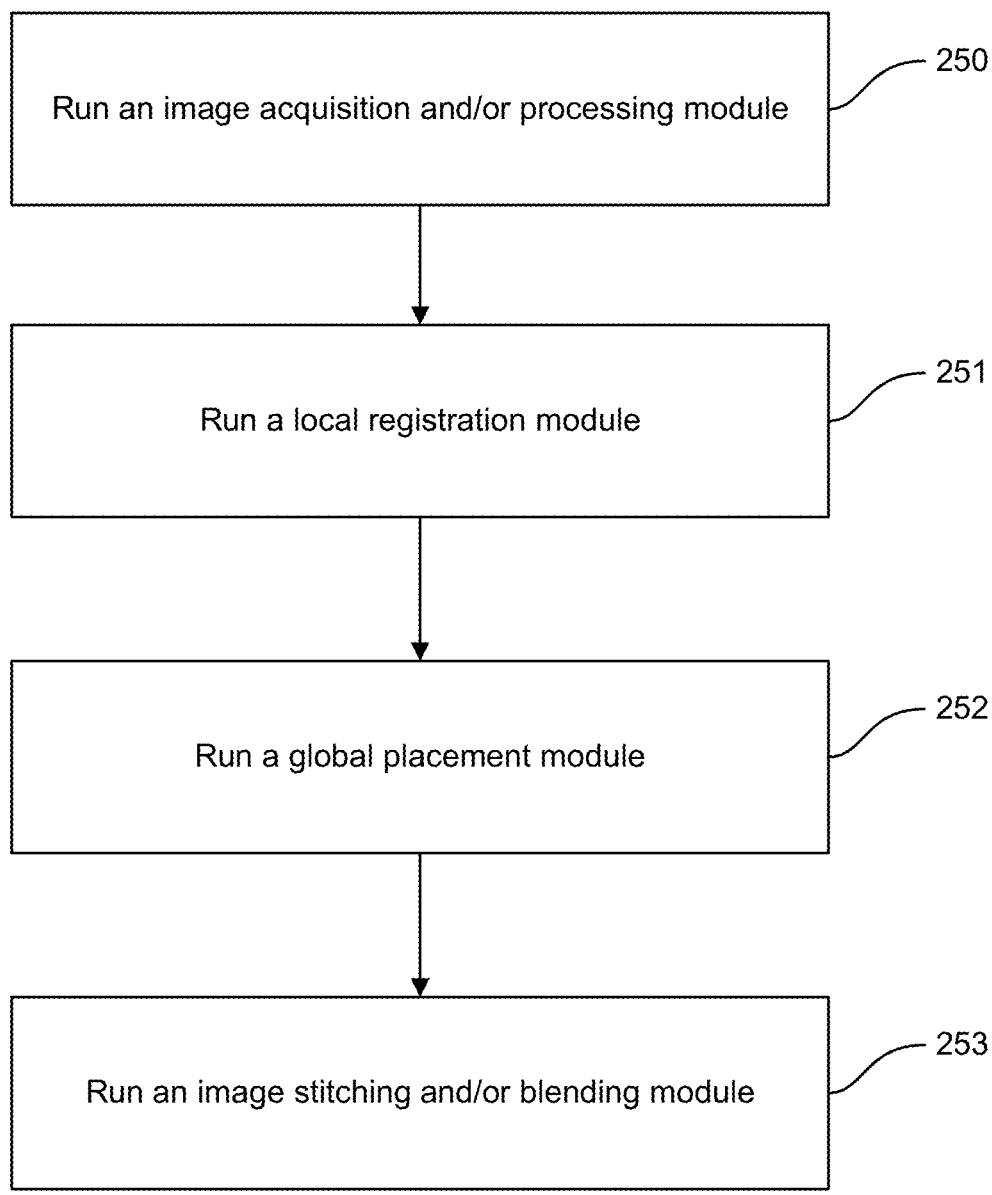
FIG. 3 sets forth a flowchart outlining a method of stitching together a series of image tiles, in accordance with some embodiments.

With reference to FIG. 3, the present disclosure provides a computer-implemented method comprising the steps of (a) running an image acquisition and/or image processing module (step 250); running a local registration module to determine spatial relationships between acquired images (step 251); and running a global placement module to place the acquired images relative to one another using the determined spatial relationships (step 252). In some embodiments, the computer-implemented method further comprises the step of running an image stitching and/or image blending module to seamlessly combine the various images using the placement data (step 253). Of course, the skilled artisan will recognize that any of the instructions, algorithms, and filters described for use within each module may be adapted or changed based on the types of images acquired, the type of image scanner used, the mode of operation of the scanner, and/or the type of specimens being studied. The skilled artisan will also appreciate that additional modules may be incorporated into the workflow. For example, an area of interest detection module may be used to determine relevant tissue regions present on the microscope slide.

Figure 4:
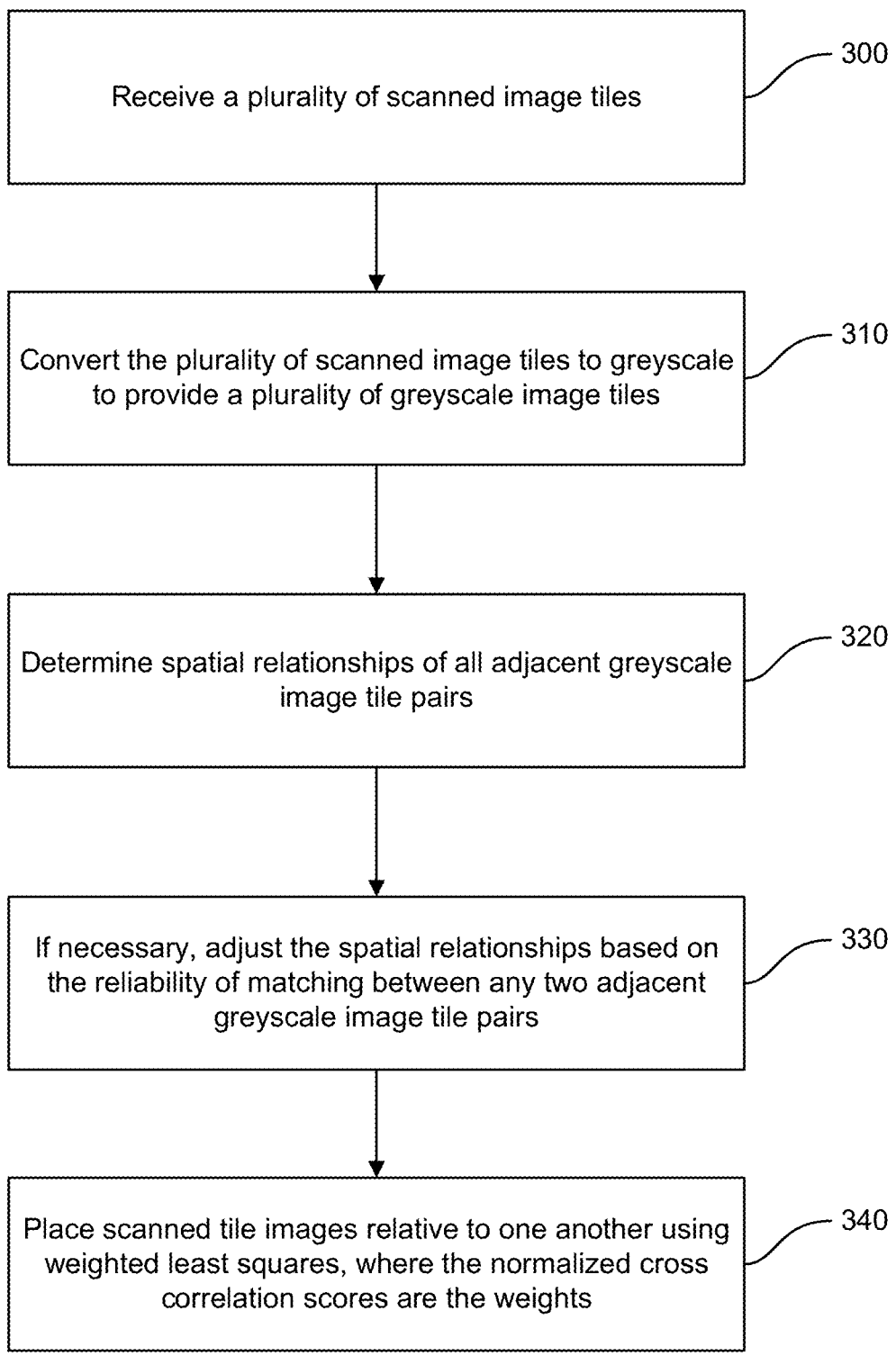
FIG. 4 sets forth a flowchart outlining a method of stitching together a series of image tiles, in accordance with some embodiments.

FIG. 4 sets forth a flowchart which provides a general overview of the methods of the presently disclosed workflow. In general, the method includes receiving a plurality of scanned images, e.g. image tiles pertaining to a scanned microscope slide (step 300); optionally converting the plurality of scanned image tiles to greyscale to provide a plurality of greyscale image tiles (step 310); determining spatial relationships between all adjacent greyscale image tile pairs (step 320); adjusting the determined spatial relationships based on the reliability of matching between any two adjacent greyscale image tile pairs (step 330); and placing the scanned tile images relative to one another using a weighted least squares method, whereby the correlation scores (described herein) are utilized as the weights (step 340).

Image Acquisition and/or Processing Module

As an initial step, and with reference to FIG. 3, the computer system runs (step 250) an image acquisition module 201 (e.g. to capture images) and/or image processing module 211 (e.g. to pre-process images). Once acquired and/or processed, the plurality of images is provided to the local registration module 212 such that the spatial relationships between adjacent image tile pairs may be derived (step 320).

In some embodiments, the images are acquired from a microscope or other instrument capable to capturing image data of a specimen-bearing microscope slide, as noted herein. In some embodiments, the images are acquired using a 2D scanner, such as one capable of scanning image tiles. In some embodiments, a scanner is employed that generally allows the capturing of consecutive "snapshots" at a particular focal length or magnification.

Microscope Slide Image Tiles

Figure 5A:
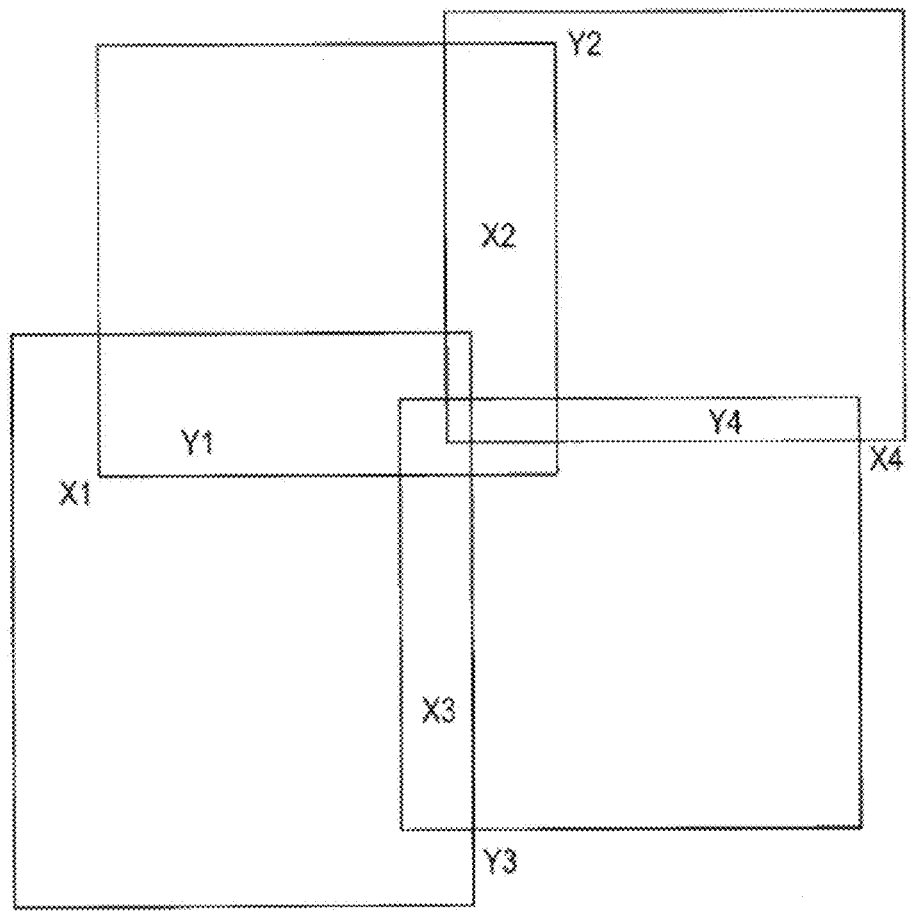
FIG. 5A illustrates overlap between a grid of image tiles, in accordance with some embodiments.

In some embodiments, the plurality of received images are series of image tiles which correspond to different portions of at least a region of interest on a specimen-bearing microscope slide. In some embodiments, overlap exists between each image tile pair, e.g. between horizontal image tile pairs or between vertical image tile pairs. It is desirable to provide at least some overlap between the images such that image stitching may be better facilitated and such that no region of the specimen-bearing microscope slide is missed (see FIG. 5A). The amount of overlap needed or recommended for successful stitching varies between applications. As will be described herein, there should be available sufficient matching pixels in any overlapping region for the method disclosed herein to compare various mathematical attributes of the matching regions and/or pixels, such as in templates selected within an overlapping region between adjacent image tile pairs.

In general, to scan an entire microscope slide with a "tiled image" architecture (see FIG. 5A) the slide is translated in X and Y (the focus axis is in Z), pausing at each frame location while an image is acquired.

Figure 5B:
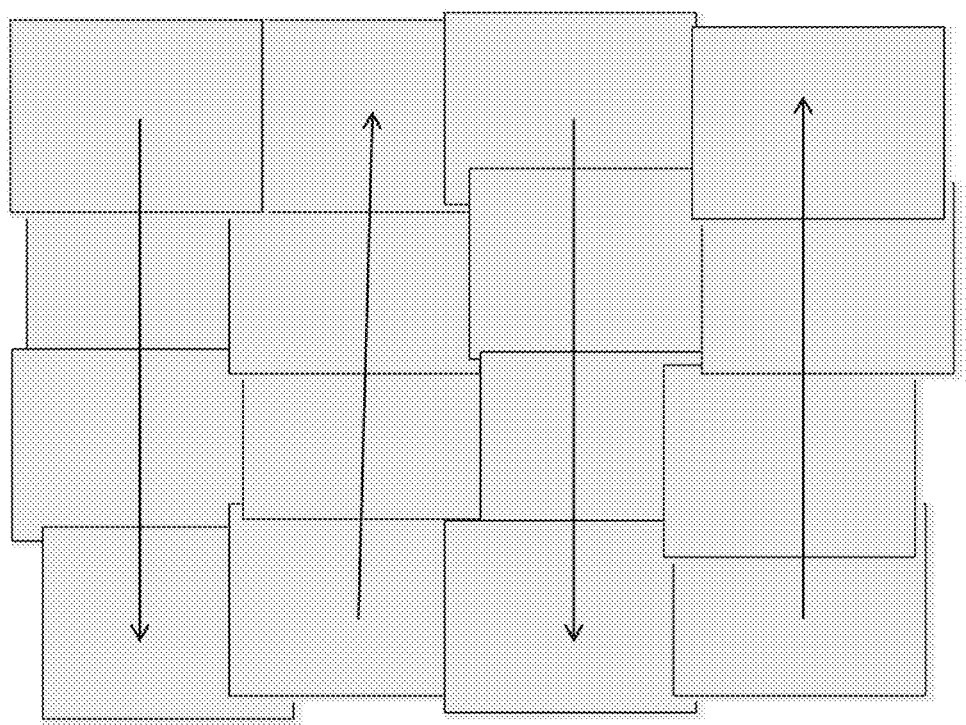
FIG. 5B illustrates overlap between a M×N series of image tiles, and further illustrates the direction of scanning according to one embodiment herein, in accordance with some embodiments.

Without being limited to a particular mode of operation or type of image tile provided as input for the workflow described herein, in some embodiments the scanning of a specimen-bearing microscope slide occurs tile by tile, and the scan is done column by column, with the direction in which the tiles are accessed being reversed per column. In this way, the With reference to the 4×4 (M×N) tile of FIG. 5B, for the first column, the tiles are acquired in the downward direction. FIG. 5B illustrates that among tiles in the first column, there exists vertical overlap and horizontal shift among a top-bottom frame pair. The skilled artisan will appreciate that the vertical overlap ensures that no region is missed during scanning. The skilled artisan will also appreciate that not all of the tiles in the first column are perfectly aligned and there exists shift amongst the tiles in the first column relative to themselves along the x-axis (e.g. x-y shift between a top-bottom tile pair (e.g. this shift may be about 20 to about 30 microns, although this amount may vary)). Without wishing to be bound by any particular theory, it is believed that this may be caused by various factors, including the general nature of the movements of mechanical instruments and/or vibrations in the motor.

Once the first column (4 tiles) is captured, the motor then moves the slide upward such that tiles within the second column may be acquired. FIG. 5B again illustrates that there exists overlap between top-bottom tile pairs. There may also exist left-right overlap between those tiles in the same horizontal row but in adjacent columns. Without wishing to be bound by any particular theory, it is believed that shift along the y-axis between tiles may exist in the same row and between adjacent columns due to changes in the constant velocity of the motor controlling some scanners. To ensure no region is missed, at least some overlap (horizontally) is intentionally acquired between tiles belonging to the same row in adjacent columns. In some embodiments, the y-shift between tiles belonging to the same row but in adjacent columns is of the order of about 500 microns to about 700 microns. In some embodiments, this y-shift is more significant than the x-shift when a top-bottom tile pair is considered during the scanning of a single column.

In some embodiments, an area of interest (AOI) of a tissue specimen of a whole slide scan is first found by running an AOI module on the computer system, as known to those of skill in the art. The AOI detection module, in some embodiments, returns a probability map, where each pixel denotes how likely it is to belong to tissue as compared to glass. Further methods of determining an AOI are described in co-pending application WO/2016/120463, the disclosure of which is hereby incorporated by reference herein in its entirety.

Conversion to Greyscale

In some embodiments, the plurality of received images are converted to greyscale to provide a plurality of greyscale image tiles (step 310). In some embodiments, the methodology is to extract the grayscale image from the RGB color image, and techniques to do so are known to those of ordinary skill in the art. In some embodiments, the luminance (brightness) channel is utilized (and not the chrominance (color) channel because when two adjacent image regions are compared, it would be expected that there would be more correspondence between the luminance channel than in between the color channels).

In alternate embodiments, in place of the grayscale image, similar channels like the luminance channel in LAB color space or Y channel in YCbCr space may be utilized.

Local Registration Module

In general, a local registration module 212 is used to estimate the spatial relationships, displacements, or geometric formations between adjacent image tile pairs (step 320), i.e. between all horizontal and vertical image tile pairs. In some embodiments, the local registration module 212 is used to find the best matching regions between two adjacent image tiles where there is overlap in a first direction and a shift in second direction perpendicular to the first direction. In some embodiments, the local registration module 212 outputs the spatial relationships between adjacent image tile pairs (e.g. tile overlap and tile shift values), normalized cross correlation scores for the best possible matching between adjacent image tile pairs, and standard deviation scores computed for matching regions between the adjacent image tile pairs.

In some embodiments, the local registration module 212 utilizes all the pixels in a prospective overlapping region of a first image of an adjacent image tile pair and matches it with all the pixels in the corresponding prospective overlapping region of a second image of the same adjacent image tile pair. A "full-search" can thus help detect subtle differences between very similar regions, i.e. between prospective overlapping regions of adjacent image tile pairs.

In a naive implementation, all possible overlapping regions between first and second images of adjacent images may be considered. A simple matching method can be to consider the grayscale image representations for both the first and second images and compute the average absolute intensity difference, per pixel, between two grayscale images of the same size. Such a method, however, often has a high computing cost. As such, computing costs can be reduced while still considering all possible matching pixels in an overlapping region between the first and second adjacent image tiles by computing spatial relationships using normalized cross-correlation (NCC) in a multi-resolution framework, as described further herein. In addition, computing costs can be further reduced through the utilization of integral images, whose implementation is also described herein.

In some embodiments, the local registration module enables determination of the overlap and shift between horizontal tile pairs as denoted in FIG. 9A, where overlap=dx (along the x-axis) and shift=dy (along the y-axis). In some embodiments, the local registration module enables determination of the overlap and shift between vertical tile pairs, where overlap=dy (along the y-axis) and shift=dx (along the x-axis). As such, the task of the local registration module is to compute (dx,dy) for all M(N−1) horizontal image tile pairs and (dx,dy) for all N(M−1) vertical image tile pairs. NCC, described herein, can be used to calculate all (dx,dy) relationships. Examples 1 and 2 herein illustrate further methods of determining spatial relationships between left-right image tile pairs and between top-bottom image tile pairs.

Multi-Resolution Framework for Computing the Normalized Cross Correlation

In some embodiments, a normalized cross correlation (NCC) is used to compare overlapping regions of adjacent image tiles. Normalized cross correlation is a technique widely used to match parts of the images, and hence establish a similarity between two objects (here, matched pixels in images corresponding to overlapping regions of adjacent greyscale image tile pairs).

More specifically, normalized cross correlation is a process used for finding incidences of a pattern or object within an image. This is performed at every step by subtracting the mean and dividing by the standard deviation, so that the result has zero mean and unit variance. In order to find the peak in the NCC a block in one image is shifted over a specified range, and the NCC is determined for each shift. That is, the cross-correlation of a template, t(x,y) with a subimage f(x,y) is $$\frac{1}{n} \sum \frac{(f(x, y) - \bar{f})(t(x, y) - \bar{t})}{\sigma_f \sigma_t}$$

where n is the number of pixels in t(x,y) and f(x,y), $\bar{t}$ is the average of f and $\sigma_f$ is standard deviation of f. In functional analysis terms, this can be thought of as the dot product of two normalized vectors. That is, if $$F(x,y) = f(x,y) - \bar{f} \text{ and } T(x,y) = t(x,y) - \bar{t},$$

then the above sum is equal to $$\left\langle \frac{F}{\|F\|}, \frac{T}{\|T\|} \right\rangle$$

where <•,•> is the inner product and ||•|| is the $L^2$ norm. Thus, if f and t are real matrices, their normalized cross-correlation equals the cosine of the angle between the unit vectors F and T, being thus 1 if and only if F equals T multiplied by a positive scalar.

Figure 6:
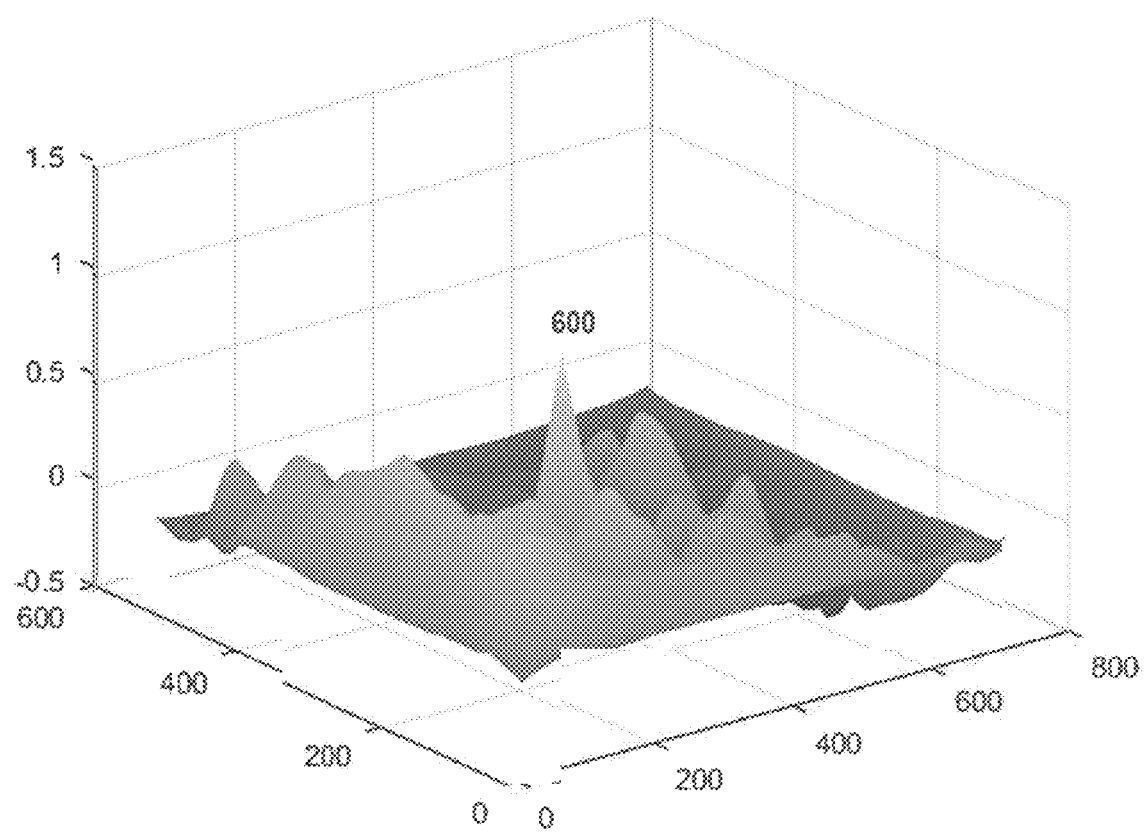
FIG. 6 illustrates a plot which shows a top NCC peak, in accordance with some embodiments.

FIG. 6 illustrates a perspective view of a surface plot resulting from a normalized cross-correlation. The skilled artisan will appreciate that the peak 600 of the cross-correlation matrix occurs where subimages are best correlated.

Figure 8:
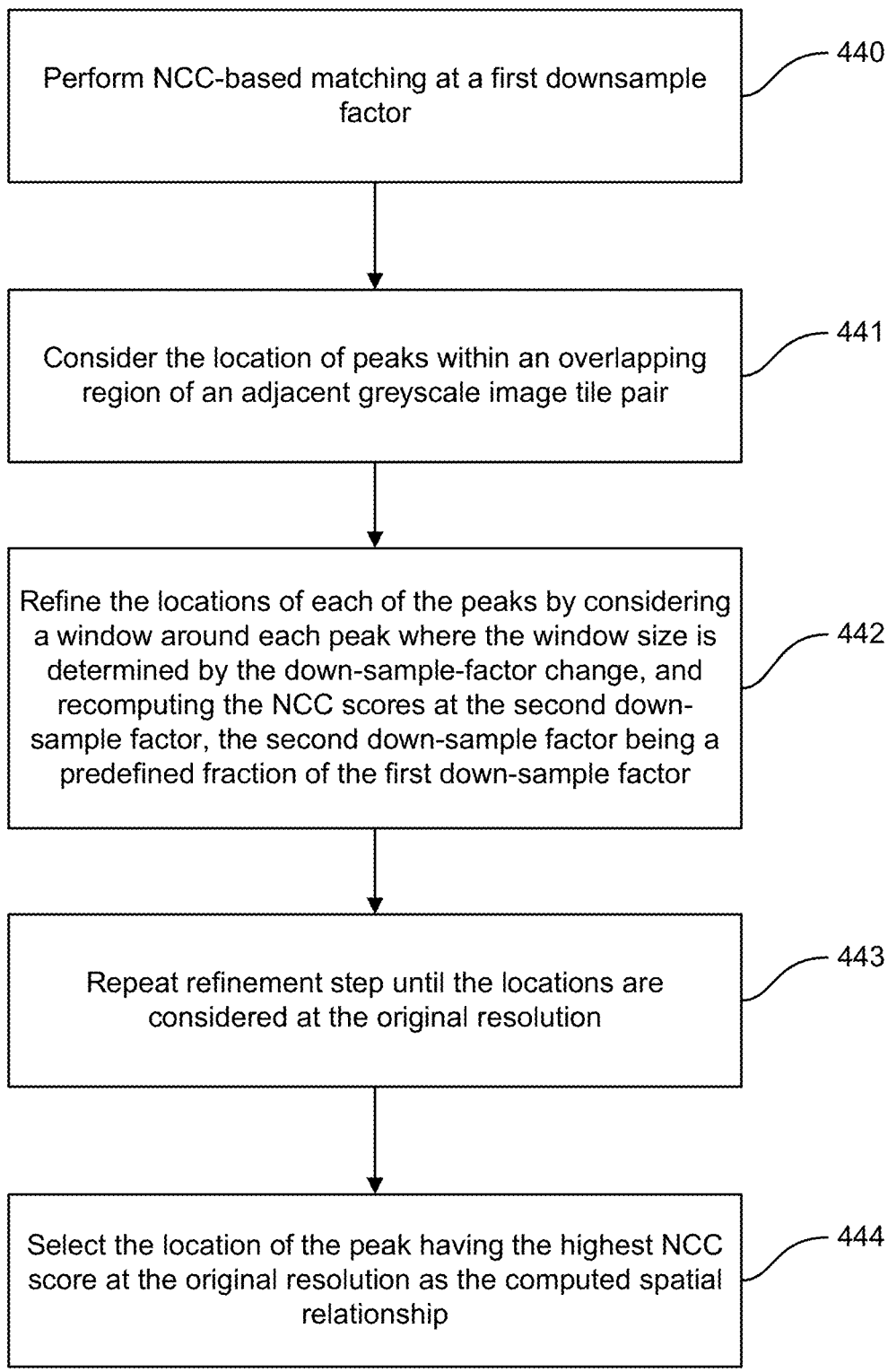
FIG. 8 sets forth a flowchart outlining a method of computing NCC scores within a multi-resolution framework, in accordance with some embodiments.

A multi-resolution approach can be applied to improve the robustness and the efficiency of the local registration (step 210). Indeed, and with reference to FIG. 8, the local registration procedure can use low resolution features as a "course estimate" for locating matched regions of prospective overlapping regions of adjacent image tiles (based on NCC scores) (steps 440 and 441) and then use higher resolution features to "fine tune" or "refine" the course estimate (steps 442 and 443). For example, suppose we consider first and second adjacent tile images down sampled by a factor of 8 (step 440). Then, we consider the template image with the prospective best matched image region (based on (x,y) shifts obtained at a down sampling factor of 8) (step 441), and then consider both these regions at down sample factor of 4 (step 442). Next, we consider the template image with the prospective best matched image region (based on (x,y) shifts obtained at a down sampling factor of 4), and subsequently consider both these regions at down sample factor of 2 (step 443). This process is repeated until we end up with the (x,y) shifts obtained at full resolution, i.e. the original resolution of the first and second images (step 444). A suitable multi-resolution approach is further described by M. Unser, A. Aldroubi, and M. Eden, "The L2-polynomial spline pyramid," IEEE Trans. Pattern Anal. Mach. Intell. 15, 364-379 1993, the disclosure of which is hereby incorporated by reference herein in its entirety.

In some embodiments, the local registration can first be performed using low resolution subsampled images such that the NCC scores for all peaks within the low resolution subsampled image can be determined (step 440). In some embodiments, the location of all peaks within first and second low resolution subsampled images are considered within the NCC domain (step 441). The skilled artisan will appreciate that within the low resolution subsampled images, the exact peak locations cannot be computed and, therefore, multiple locations are retained and refined as the computation of NCC scores within the multi-resolution framework progresses (steps 441, 442, and 443). Here, the first and second low resolution subsampled images, which correspond to an overlapping region of an adjacent greyscale image tile pair, are down sampled from an original resolution by a predetermined down sampling factor.

The skilled artisan will appreciate that the low resolution subsampled images may be down sampled from the original resolution by any down sampling factor. In some embodiments, the low resolution subsampled images are down sampled by a factor of at least 8. In other embodiments, the low resolution subsampled images are down sampled by a factor of at least 16. In yet other embodiments, the low resolution subsampled images are down sampled by a factor of at least 32. In further embodiments, the low resolution subsampled images are down sampled by a factor ranging from between 6 and 48.

In some embodiments, only the location of the peaks meeting certain predefined thresholds are retained for further evaluation, i.e. retained for location refinement. In some embodiments, the predefined threshold may be a predetermined NCC score threshold. In other embodiment, the predefined threshold may be a predefined percentage of a top NCC score considering all returned image scores. For example, it may be that only the locations of peaks are retained where the NCC score for those peaks is within 10% of the top NCC score.

The locations of the peaks, such as those that meet the predefined threshold, are then considered at the next higher resolution such that the locations of the peaks may be refined at that resolution, e.g. the locations of the peaks may be refined by +/−1 pixel in the x, y space. For example, if the first and second low resolution subsampled images were down sampled by a factor of 8, then the next higher resolution subsampled images may be down sampled by a factor of 4 as compared with the original image (step 442). This process is then sequentially propagated at the next higher resolution, e.g. a down sampling by a factor of 2, until NCC scores are considered at a down sampling factor of 1, i.e. considered at the original resolution (steps 443 and 444).

A final peak location is given by the peak which produces the maximum NCC score at a down sampling factor of 1 (step 444). At this stage, the standard deviation between the overlapping regions is recorded. Suppose we have a left to right tile pair where the rightmost 50 columns in left image, and the leftmost 50 columns in right image are overlapping. Then we compute the standard deviation for the rightmost 50 columns in left image; and also for the leftmost 50 columns in right image. The minimum of these two quantities may be regarded as the standard deviation for the 2 windows.

By way of first example, we assume that the matching at a given resolution (e.g. down sampling by a factor of 8) yields multiple peaks and we consider all the peaks having a score of at least 90% of the top peak (considering the normalized cross correlation scores). Suppose 10 peaks are located using one-eighth down scaling. The NCC scores are then considered for all 10 peaks using one-quarter down scaling (we consider a 3×3 window around each peak). The NCC scores are then considered for all 10 peaks using one-half down scaling (again considering 3×3 window around each peak), and again using scale factor of 1. For each matching region, the correlation scores are recorded and also the minimum standard deviation among the two matching regions. The final registration solution is given by the topmost correlation peak while considering NCC scores at the original resolution. The standard deviation scores are useful as they show when the matching is unreliable, as will described in more detail herein.

By way of another example, first and second low resolution subsampled images are obtained corresponding to an overlapping region of an adjacent greyscale image tile pair, and that the first and second low resolution subsampled images were down sampled at a down sampling factor of 8. Suppose that a location of a matching peak was found at (21,30)=(dx, dy) at this resolution. For purposes of this example, while we are considering only a single peak in each set of subsampled images, the skilled artisan will appreciate that multiple peaks may be found within each set of subsampled images, such as noted in the example above.

The location of the peak found at (21,30) may then be refined using a series of sequentially higher resolution subsampled images. For example, considering the peak at (21,30) at the next higher resolution, i.e. a down sampling factor of 4 as compared with the original resolution image, it may lie at ((21*2)+/−1), (30*2)+/−1)), after considering the NCC scores in a 3×3 window around the (21*2, 30*2) point. For purposes of this example, let's assume that the peak was located at (41,61) after considering the NCC scores.

The peak at (41,61) is then considered in the next higher resolution subsampled image, i.e. one down sampled at a down sampling factor of 2 as compared with the original resolution image. This peak may then be located at ((41*2)+/−1), (61*2)+/−1)), after considering the NCC scores in a 3×3 window around the (41*2, 61*2) point. For purposes of this example, let's assume that the peak was located at (83,121) after considering the NCC scores.

The peak at (83,121) is then considered in the next higher resolution subsampled image, i.e. one down sampled at a down sampling factor of 1 as compared with the original resolution image. This peak may then be located at ((83*2)+/−1), (121*2)+/−1)), after considering the NCC scores in a 3×3 window around the (83*2, 121*2) point. For purposes of this example, let's assume that the peak was located at (167,243) after considering the NCC scores. This location at (167,243) may be retained spatial location (again, assuming that this location would have returned the highest NCC score of all locations considered).

Integral Images

In some embodiments, NCC scores are calculated using integral images. In some embodiments, in order to reduce computational complexity, the NCC scores between an overlapping region of two adjacent images may be calculated using an integral image such that any computation cost or complexity is at least partially reduced.

Figure 7A:
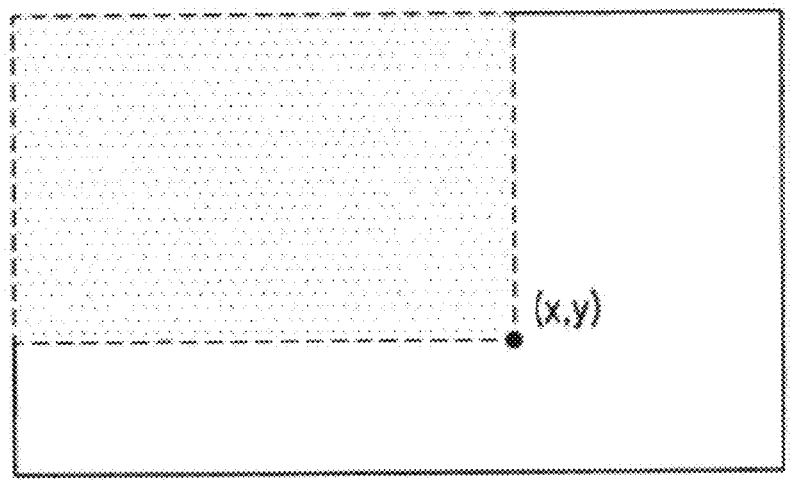
FIGS. 7A and 7B demonstrate the concept of integral images, in accordance with some embodiments.

An integral image, also known as a "summed area table," is a data structure and algorithm for quickly and efficiently generating the sum of values in a rectangular subset of a grid. In general, the integral image is used to calculate an area of a rectangle formed by a top-left point serving as an origin and a bottom-right point. More specifically, is an intermediate representation for the image and contains the sum of gray scale pixel values of image. As such, the value at any point (x, y) in the summed area table is the sum of all the pixels above and to the left of (x, y), inclusive. With reference to FIG. 7A, a pixel value of (x, y) indicates the total sum of pixels corresponding a dotted block area. Therefore, $I_{int\ g}(0, 0)$ indicates a pixel value at coordinates (0, 0), and $I_{int\ g}$(width−1, height−1) indicates the total sum of all pixels of a given image.

Figure 7B:
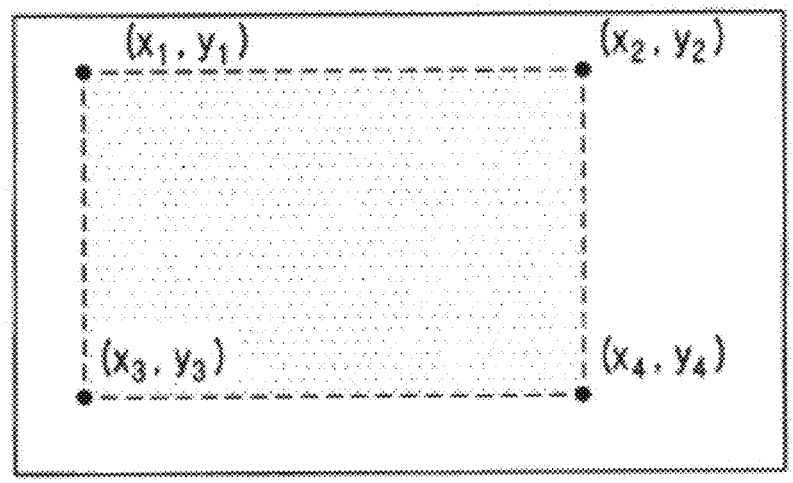

Through such an integral image, it is possible to obtain the total sum of pixels within a required area by using summation and subtraction of pixel values corresponding to four vertexes of the area. For example, the total sum of pixels corresponding to a dotted block area in FIG. 7B can be obtained by using pixel values of four vertexes $(x_1, y_1)$, $(x_2, y_2)$, $(x_3, y_3)$, and $(x_4, y_4)$ through the formula defined below.

$$I_{int\ g}(x_4,y_4)+I_{int\ g}(x_1,y_1)-I_{int\ g}(x_2,y_2)-I_{int\ g}(x_3,y_3)$$

Suppose, we have two image windows, X and Y, and we wish to compute the normalized cross correlation NCC(X, Y) between them.

We can show that $NCC(X,Y)=\{Dot(X,Y)-sum(X)\cdot sum(Y)/N\}/\{sqrt(sum(X2)/N-(sum(X)/N)2)\cdot sqrt(sum(Y2)/N-(sum(Y)/N)2)\}$, Where Dot(X,Y) is the inner product between the two image matrices X and Y, $X^2$ and $Y^2$ are the images obtained after squaring each pixel in X and Y.

Thus, if the 1st and 2nd moments are available for all possible overlapping image positions, we can compute integral images (using image and squared image) so that the mean and standard deviation in any sub-window can be efficiently computed.

Suppose, we have a 100×100 image (X). Suppose we need to compute the sum of the image and squared image, over an image sub-window X' from (11,11) to (90,90). Now, instead of summing up all the pixels in X", we compute an integral image $I_1$ where:

$$I_1(x,y)=sum_{\{i<=i<=x,1<=j<=y\}}X(i,j)$$

Once the integral image based on first moments is computed, we use the following formula to compute the sum over a sub-window of X:

$$\text{sum of } X(i,j)_{\{x1<=i<=x2,y1<=j<=y2\}}=I_1(x_2,y_2)-I_1(x_1-1, y_1-1).$$

Similarly, to compute the sum of the square of image pixels over an image sub-window, we compute an integral window I2, where:

$$I_2(x,y)=sum_{\{1<=i<=x,1<=j<=y\}}X^2(i,j)$$

(where $X^2(i,j)=X(i,j)*X(i,j)$).

Once the integral image based on $2^{nd}$ moments is computed, we use the following formula to compute the sum over a sub-window of $X^2$:

$$\text{sum of } X^2(i,j)_{\{x1<=i<=x2,y1<=j<=y2\}}=I_2(x_2,y_2)-I_1(x_1-1, y_1-1).$$

Thus, once the integral images $I_1$ and $I_2$ are computed (for both images under consideration), the only quantity needed to compute to obtain NCC(X,Y) is:

$$Dot(X,Y)=sum_{\{1<=i<=M1,1<=j<=N1\}}X(i,j)*Y(i,j),$$

where both X and Y are M1×N1 images.

Global Placement Module

After the spatial relationships between all adjacent greyscale image tile pairs are determined (step 320) with the local registration module 212, a global placement module 213 is used to place the scanned tile image relative to one another (step 340). In some embodiments, the global placement acts as a regularizer and compensates for those cases where the local registration either failed or had insufficient data to succeed (e.g. in those regions where there is white space to white space matching).

Adjustment of Spatial Relationships

In some embodiments, and prior to placement of the image tiles, the determined spatial relationships are adjusted (step 330). In some embodiments, the spatial relationships are adjusted based on the reliability of matching between any two-adjacent greyscale image tile pairs. Here, the term "reliability" refers to the fact that there may be a low number of pixels that match within any given region or the region may not have a high enough contrast, i.e. low contrast. In some embodiments, the determination of whether a spatial relationship between any two-adjacent greyscale image tile pairs is considered reliable comprises comparing a standard deviation value derived between the two-adjacent greyscale image tile pairs and comparing that standard deviation to a standard deviation threshold.

In the context of scans of specimen bearing microscope slides, unreliable matching may occur between areas comprising white-space, i.e. in regions where there is no tissue but only glass, the scanned image will appear white at regions corresponding to the substrate. As noted herein, in these instances the intensity value for the substrate regions will correspond to the white point setting for the scan, e.g. if the white point is set at 250, then the substrate regions will have a pixel intensity value of 250. The skilled artisan will appreciate that the standard deviations for white-space regions is low because the white-space regions have roughly the same intensity value. On the other hand, it would be expected that the standard deviation would be comparatively higher when the prospective matching region has content (such as tissue for a tissue slide).

As noted herein, the spatial relationships between adjacent greyscale image tile pairs may comprise tile overlap and tile shift. In some embodiments, the adjustment may be assigning an average overlap value or an average overlap shift value in place of the determined tile overlap and shift values, respectively, for those greyscale image tile pairs deemed unreliable. In other embodiments, the adjustment may be the assignment of a lower confidence score to the greyscale image tile pairs deemed unreliable.

In the context of scanning microscope slides according to the procedure described herein and as illustrated in FIG. 5B, the overlap between bottom-top tile pair is often significant as the natural movement of the scanner is column-wise, either upward or downward. On the other hand, when the left-right tile pair is considered, the x-overlap between tiles in the same row may not be significant, depending on the relative motion of the glass slide for two successive columns. In view of this, in some embodiments both the standard deviation and NCC based scores are used to detect when the left-right matching is effective, e.g. for an effective matching case when the prospective matching region is primarily non-whitespace, then both standard deviation and NCC scores will be high. Likewise, for bottom-top tile pairs, we use the standard deviation to indicate when the matching region consists mainly of whitespace.

The skilled artisan will appreciate that NCC scores lies in the range [−1,1]. For example, we may empirically decide on some thresholds: $\delta 1=0.01$ (when NCC is $<=\delta 1$, we have low confidence in the NCC based matching) and $\delta 2=0.02$ (when NCC is $>\delta 1$ but $<=\delta 2$, we have medium confidence in the NCC based matching). Also, we may consider the grayscale representations of the RGB images when we compute dx, dy, confidence and standard deviation values. When the maximum of the standard deviation values computed from the matching region in each tile in the tile-pair exceeds a certain threshold (e.g. $\sigma 1=10$), then it is more likely the matching region for that tile-pair consists mainly of white-space (and is therefore unreliable). As example of tile pairs where we do not wish to use the dx, dy values computed; we consider only those tiles where the matching is more reliable and where the standard deviation in the common regions is high enough (e.g. >10).

For bottom-top tile pairs, the (dx, dy) values computed through NCC based matching may be left unchanged. When the NCC based matching is thought to be unreliable, then the confidence score of the matching is reduced to a low value. For example, it may be that when the matching region consists mainly of white-space, the NCC based matching score is high and the standard deviation is low. As a result, the (dx, dy) solution may be inaccurate as the matching is mainly of whitespace in one tile to whitespace in an adjacent tile. Hence, if a higher confidence is assigned to this (dx, dy) solution, it may adversely affect the overall global placement. The remedy is, therefore, to assign less importance to this (dx, dy) solution by assigning a lower confidence score to this solution. A sample solution for assigning lower confidence is illustrated in Example 3, herein.

Next, the case of matching left-right tile pairs is considered. For adjacent left-right tiles where the matching region consists mainly of white-space, we use the average (dx, dy) values obtained from left-right image pairs to approximate the (dx-overlap and dy-shift) values between the tiles.

With regard to matching left-right tile pairs, a pair-matching is deemed reliable if the corresponding NCC score is high and also if the corresponding standard deviation score is high enough. In some embodiments, when we say "NCC score is high," we imply that the NCC score are higher than an intermediate values between [−1, 1] such as 0.25. By way of example, a standard deviation value may be "high enough" when the value is higher than 20. In this example, this would mean that the overlapping region is likely to be a non-whitespace region. When the matching is unreliable, it has been empirically found that the accurate solution for the global placement needs good starting (dx, dy) values for all these left-right tile pairs. In some embodiments, when the local matching fails, we replace the dx, dy by the average dx, dy for the whole row/column, as described further herein. These average values are examples of good initialization. We use the average (dx, dy) values depending on whether the tile-pair belongs to a positive-dy or negative-dy column. For a given column, all the left-right tile pairs have the same directionality for dy; also, this directionality alternates for alternate columns; i.e. if we consider 10 columns, the sign of the dy values for these 10 columns can be +,−,+,−,+,−,+,−,+,− or −,+,−,+,−,+,−,+,−,+. As such, and in this particular context, the dy (y-shift) values are expected to have the same direction for columns 1, 3, 5, . . . (odd numbered columns); also, the even numbered columns are expected to have the reverse direction. A sample solution for assigning average (dx,dy) values is illustrated in Example 4, herein.

Weighted Least Squares Based Solution for Global Placement

Following the optional adjustment of the spatial relationships between image tile pairs (step 330), a weighted least squares solver is used to determine tile placement based on the derived spatial relationships (step 340). In some embodiments, the weighted least squares solver utilizes the derived NCC scores as weights.

Weighted least squares is useful for estimating the values of model parameters when the response values have differing degrees of variability over the combinations of the predictor values. Unlike linear and nonlinear least squares regression, weighted least squares regression is not associated with a particular type of function used to describe the relationship between the process variables. Instead, weighted least squares reflects the behavior of the random errors in the model; and it can be used with functions that are either linear or nonlinear in the parameters. Weighted least squares works by incorporating extra nonnegative constants, or weights, associated with each data point, into the fitting criterion. The size of the weight indicates the precision of the information contained in the associated observation. Optimizing the weighted fitting criterion to find the parameter estimates allows the weights to determine the contribution of each observation to the final parameter estimates. In some embodiments, the NCC scores derived with the local registration module are used as the weights in a weighted least squares analysis.

In weighted least squares parameter estimation, as in regular least squares, the unknown values of the parameters, $\beta 0, \beta 1, \ldots$, in the regression function are estimated by finding the numerical values for the parameter estimates that minimize the sum of the squared deviations between the observed responses and the functional portion of the model. Unlike least squares, however, each term in the weighted least squares criterion includes an additional weight, wi, that determines how much each observation in the data set influences the final parameter estimates. The weighted least squares criterion that is minimized to obtain the parameter estimates is $$Q = {}_n\Sigma_{i=1} w_i [y_i - f(\vec{x}_i; \vec{\beta})]^2$$

For the placement solution, in some embodiments the following assumptions may be made:

Assume two frames L (left) and R (right), where common x intersection between the frames is dx, and R is dy units above L;

Then if (Lx, Ly) is top left corner of L, then top left corner of R (Rx, Ry) is as follows:

$$Rx = Lx + (width - dx) \text{ ($x$ increases from left to right)}$$

$$Ry = Ly + (-dy) \text{ ($y$ increases from top to bottom)}$$

For M rows and N cols among the tiles, we get M(N−1) such pairs

Consider a top image (T) and a bottom image (B), where the common y intersection is dy, and T is located dx units to right of B;

If (Tx, Ty) is top left corner of T, then top left corner (Bx, By) of B is given as:

$$Bx = Tx - dx; By = Ty + (height - dy)$$

With M rows and N cols of tiles, there are N(M−1) such pairs of top-bottom images. Thus, we have M(N−1)+M(N−1) linear equations considering left-right and bottom-top pairs; number of unknowns is M*N tile locations (top left tile location can be used as reference); thus, there are redundant equations and we can afford to discard equations with very low standard deviation if possible. In some embodiments, weighted least squares is used where the NCC scores are utilized as the weights. In Matlab, the function is "lscov" (least squares using known covariance).

Example 5 illustrates a method of determining tile placement using the above-described weight least squares approach.

Other Components

The computer system of the present disclosure may be tied to a specimen processing apparatus that can perform one or more preparation processes on the tissue specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

A specimen can include a tissue sample. The sample of tissue can be any liquid, semi-solid or solid substance (or material) in or on which a target can be present. In particular, a tissue sample can be a biological sample or a tissue sample obtained from a biological tissue. The tissue can be a collection of interconnected cells that perform a similar function within an organism. In some examples, the biological sample is obtained from an animal subject, such as a human subject. A biological sample can be any solid or fluid sample obtained from, excreted by or secreted by any living organism, including without limitation, single celled organisms, such as bacteria, yeast, protozoans, and amoebas among others, multicellular organisms (such as plants or animals, including samples from a healthy or apparently healthy human subject or a human patient affected by a condition or disease to be diagnosed or investigated, such as cancer). For example, a biological sample can be a biological fluid obtained from, for example, blood, plasma, serum, urine, bile, ascites, saliva, cerebrospinal fluid, aqueous or vitreous humor, or any bodily secretion, a transudate, an exudate (for example, fluid obtained from an abscess or any other site of infection or inflammation), or fluid obtained from a joint (for example, a normal joint or a joint affected by disease). A biological sample can also be a sample obtained from any organ or tissue (including a biopsy or autopsy specimen, such as a tumor biopsy) or can include a cell (whether a primary cell or cultured cell) or medium conditioned by any cell, tissue or organ. In some examples, a biological sample is a nuclear extract. In certain examples, a sample is a quality control sample, such as one of the disclosed cell pellet section samples. In other examples, a sample is a test sample. For example, a test sample is a cell, a tissue or cell pellet section prepared from a biological sample obtained from a subject. In an example, the subject is one that is at risk or has acquired a particular condition or disease. In some embodiments, the specimen is breast tissue.

The processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the waste remover removes the deparaffinizing fluid(s), any number of substances can be successively applied to the specimen. The substances can be for pretreatment (e.g., protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. Probes can be an isolated nucleic acid or an isolated synthetic oligonucleotide, attached to a detectable label or reporter molecule. Labels can include radioactive isotopes, enzyme substrates, co-factors, ligands, chemiluminescent or fluorescent agents, haptens, and enzymes.

The specimen processing apparatus can be an automated apparatus, such as the BENCHMARK XT instrument and SYMPHONY instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

After the specimens are processed, a user can transport specimen-bearing slides to the imaging apparatus. The imaging apparatus used here is a brightfield imager slide scanner. One brightfield imager is the iScan Coreo™ brightfield scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES or disclosed in U.S. Patent Application No. 61/533,114, filed on Sep. 9, 2011, entitled IMAGING SYSTEMS, CASSETTES, AND METHODS OF USING THE SAME. International Patent Application No. PCT/US2010/002772 and U.S. Patent Application No. 61/533,114 are incorporated by reference in their entities. In other embodiments, the imaging apparatus includes a digital camera coupled to a microscope.

The imaging system or apparatus may be a multispectral imaging (MSI) system or a fluorescent microscopy system. The imaging system used here is an MSI. MSI, generally, equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

An MSI may include an optical imaging system, a portion of which contains a spectrally-selective system that is tunable to define a pre-determined number N of discrete optical bands. The optical system may be adapted to image a tissue sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the tissue as the spectrally selective system is being adjusted or tuned (for example with a computer processor) such as to assure that images are acquired in different discrete spectral bands. The apparatus may additionally contain a display in which appears at least one visually perceivable image of the tissue from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular pass-band from the spectrum of light transmitted from the light source through the sample towards the detector.

An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Any of the modules described herein may include logic that is executed by the processor(s). "Logic," as used herein, refers to any information having the form of instruction signals and/or data that may be applied to affect the operation of a processor. Software is an example of logic.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). For example, the network 20 of FIG. 1 can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

EXAMPLES

All of the Examples which follow assume a whole slide scan which has M×N tiles (M rows and N columns).

Example 1—Determination of Spatial Locations, NCC Scores, and Standard Deviation Values for Left-Right Image Tile Pairs Input: M×N tiles; the overlap along x-axis between left-right tile pair is x1<=dx<=x2; the y-shift which when applied on the right tile will align it with left tile can vary from −y max<=dy<=y max Output: for M×(N−1) left-right image pairs, we compute for each pair (i,j):

$dx_{LR}(i,j)$: overlap along x-axis between left tile (i-th row, j-th column) and right tile (i-th row, (j+1)th column)

$dy_{LR}(i,j)$: shift along y-axis between the above mentioned tile-pair: if $dy_{LR}(i,j)$ is positive, it means the right tile has to be shifted downward to align it with the left tile $conf_{LR}(i,j)$: NCC score when we consider NCC between the matching regions for the above mentioned left-right tile pair $std_{LR}(i,j)$: the standard deviation score when we consider the maximum of the standard deviation, computed for the matching regions for both the left and right tiles Method:
FOR i=1:M//row index
FOR j=1:N-1//col index
Compute NCC between all possible matching regions in left tile (i-th row, j-th column) and right tile (i-th row, (j+1)th column), assuming $x_1 <= dx <= x_2$, and y min<=dy<=y max (this is to consider left-right matching for an assumed downward displacement of the right tile)

Compute NCC between all possible matching regions in left tile (i-th row, j-th column) and right tile (i-th row, (j+1)th column), assuming $x_1 <= x <= x_2$, and -y max<=dy<=-y min (this is to consider left-right matching for an assumed upward displacement of the right tile).

We use a small value of dy (e.g. y min=40 pixels) so that we do not have to consider the case of no vertical displacement of the right tile. Considering very less overlap between left and right tiles can lead to numerical instability when we compute NCC scores (as the score is computed over a very small number of pixels). Avoiding the zone-y min<=dy<=y min, when we compute NCC scores, returns more meaningful NCC scores.

END FOR//FOR col=1:N-1
END FOR//FOR row=1:M
Condition 1: $1^{st}$ column has positive dy while $2^{nd}$ column has negative dy:
S1=average of (NCC scores considering all M×(N-1) tile-pair sets), for condition 1
Condition 2: 1st column has negative dy while 2nd column has positive dy:
S2=average of (NCC scores considering all M×(N-1) tile-pair sets), for condition 2
If S1>=S2, Condition 1 is valid Else Condition 2 is valid.
OUTPUT: return $dx_{LR}(i,j)$, $dy_{LR}(i,j)$, $conf_{LR}(i,j)$, $std_{LR}(i,j)$; for $1<=i<=M$, $1<=j<=N$, depending on whether Condition 1 or Condition 2 is valid

Example 2—Determination of Spatial Locations, NCC Scores, and Standard Deviation Values for Top-Bottom Image Tile Pairs Input: M×N tiles; the overlap along y-axis between bottom-top tile pair is $y1<=dx<=y2$; the x-shift which when applied on the top tile will align it with bottom tile can vary from -x max<=dx<=x max Output: for (M-1)×N bottom-top image pairs, we compute for each pair (i,j):

$dy_{BT}(i,j)$: overlap along y-axis between top tile (i-th row, j-th column) and bottom tile ((i+1)th row, j-th column)

$dx_{BT}(i,j)$: shift along x-axis between the above mentioned tile-pair: if dx(i,j) is positive, it means the top tile has to be shifted right to align it with the bottom tile $conf_{BT}(i,j)$: NCC score when we consider NCC between the matching regions for the above mentioned bottom-top tile pair $std_{BT}(i,j)$: the standard deviation score when we consider the maximum of the standard deviation, computed for the matching regions for both the top and bottom tiles Method:
FOR j=1:N//col index
FOR i=1:M-1//row index
Compute NCC between all possible matching regions in top tile (i-th row, j-th column) and bottom tile ((i+1)-th row, j-th column), assuming $y_1<=dy<=y_2$, and x min<=dx<=x max
END FOR//FOR row=1:M-1
END FOR//FOR col=1:N OUTPUT: return $dx_{BT}(i,j)$, $dy_{BT}(i,j)$, $conf_{BT}(i,j)$, $std_{BT}(i,j)$; for $1<=i<M$, $1<=j<=N$

Example 3—Method for Assigning a Lower Confidence to Top-Bottom Image Tile Pairs For j=1:N//col index
For i=1:M-1//row index
If $std_{BT}(i,j)<\sigma_1$
$conf_{BT}(i,j)=\delta_1$
end if//end if:
end for//row index
end for//col index

Example 4—Method for Assigning Average Overlap and Shift Values to Left-Right Image Tile Pairs Here, $Avgdx_{odd}(i)$ is the average x-overlap for a left-right tile pair when both the tiles are in the i-th row and the left tile lies in an odd-numbered column. Similarly, $Avgdy_{odd}(i)$ is the average y-shift for a left-right tile pair when both the tiles are in the i-th row and the left tile lies in an odd-numbered column.

```
/*----------------------------------------------------------------*/
For i = 1:M
Avgdx_odd(i) = average of { dx_LR(i,j), 1 <= j <= N}
Avgdy_odd(i) = average of { dy_LR(i,j), 1 <= j <= N}
Avgdx_even(i) = average of { dx_LR(i,j), 2 <= j <= N}
Avgdx_even(i) = average of { dy_LR(i,j), 2 <= j <= N}
End for
/*----------------------------------------------------------------*/
```

The following module describes how we update the (dx, dy) values as well as the NCC based confidence values for left-right tile pairs.

```
/*----------------------------------------------------------------*/
For j = 1:2:N // here we consider cases where the left tile is in an
odd-numbered column
For i = 1:M //here we iterate over all rows
If std_LR(i,j) > σ_1 and conf_LR(i,j) > δ_2
// no modification needed
Else
dx_LR(i,j) = Avgdx_odd(i,j)
dy_LR(i,j) = Avgdy_odd(i,j)
conf_LR(i,j) = δ_1
End if
End for //end of iteration over rows
End for // end of iteration over odd-numbered columns
/*----------------------------------------------------------------*/
For j = 2:2:N // here we consider cases where the left tile is in an
even-numbered column
For i = 1:M // here we iterate over all rows
If stdLR(i,j) > σ1 and confLR(i,j) > δ2
// no modification needed
Else
dxLR(i,j) = Avgdxeven(i,j)
dyLR(i,j) = Avgdyeven(i,j)
confLR(i,j) = δ1
End if
End for //end of iteration over rows
End for // end of iteration over even-numbered columns
/*----------------------------------------------------------------*/
```

Example 5—Weighted Least Squares Solution

For a M×N set of tiles, we need to compute the (x,y) top-left locations for all the tiles. As a reference point, we assume (0,0) to be the top-left corner of the (1,1)-th tile. Let $(F_x(i,j), F_y(i,j))$ be the (x,y) coordinate for the top-left location for the (i,j)-th tile. Let Ht denote the number of rows (height) per tile image, and Wd denote the number of columns (width) per tile image.

```
/*--------------------------------------------------------------
----------------------------------------------------------------
----*/
```

The following illustrates how the (dx, dy) values from left to right tile matching are used to determine tile (x,y) positions:

```
For i = 1:M //row index
For j = 1:N-1 //col index
F_x(i, j + 1) = F_x(i,j) + (Wd - dx_LR(i,j))
F_y(i, j + 1) = F_y(i,j) - (dy_LR(i,j))
End for // col index
End for //row index
/*------------------------------------------------------------*/
/*------------------------------------------------------------*/
```

The following illustrates how the (dx, dy) values from bottom to top tile matching are used to determine tile (x,y) positions:

```
For j = 1:N //col index
For i = 1:M-1 //row index
F_x(i + 1, j) = F_x(i,j) + (- dx_BT(i,j))
F_y(i + 1, j) = F_y(i,j) + (Ht - dy_BT(i,j))
End for // row index
End for //col index
/*------------------------------------------------------------*/
```

Considering the mapping between $F_x$ terms and the dx terms, we obtain the following equations:

$$AX=D$$

(here W is known, D is the observation vector and X is to be determined)

Where X is a (M×N)×1 vector (unknown variables: contain x-coordinates of top-left of all tiles);

D is a (M×(N−1)+N×(M−1))×1 vector (dx overlap for left-right pairs and dx shifts for top-bottom pairs); and A is a (M×(N−1)+N×(M−1))×(M×N) matrix.

$X=[Fx(1,1)\ Fx(1,2)\ Fx(1,3)\ \ldots\ Fx(1,N)\ Fx(2,1)\ Fx(2,2)\ \ldots\ Fx(2,N)\ \ldots\ Fx(M,N)]^T$ (thus X represents the x-coordinates of the top-left corner for each image tile, tiles being considered row-wise)

Thus, $X_i = F_x(\text{ceil}(i/N), \text{mod}(i,N))$// when i is a multiple of N, we replace mod(i,N) by N A note about the use of notation: mod(m,n)=n (and not zero) if m is a multiple of $$D=[(dx_{LR}(1,1)-Wd)(dx_{LR}(1,2)-Wd)(dx_{LR}(1,3)-Wd)\ \ldots\ (dx_{LR}(M,N-1)-Wd)dx_{BT}(1,1)dx_{BT}(2,1)$$
$$dx_{BT}(3,1)\ \ldots\ dx_{BT}(M-1,1)dx_{BT}(1,2)dx_{BT}(2,2)$$
$$dx_{BT}(3,2)\ \ldots\ dx_{BT}(M-1,N)]^T$$

Thus, in D, the left-right matching based dx terms are first considered row-wise and the bottom-top matching based dx terms are next considered column-wise.

$$D_i=dx_{LR}(\text{ceil}(i/(N-1)),\text{mod}(i,N-1))-Wd$$

// when i is a multiple of N−1, we replace mod(i, N−1) by N−1; for 1<=i {M×(N−1)}

$$D_i=dx_{BT}(\text{mod}((i-(M\times(N-1))),M-1),\text{ceil}((i-(M\times(N-1)))/(M-1)));$$

for {M×(N−1)+1} i {M×(N−1)+N×(M−1)}

The matrix A is a sparse matrix where the only non-zero terms are as follows:

The first M×(N−1) rows in W consist of M {(N−1)×(N−1)} block matrices, where each block matrix has 1 on the main diagonal and −1 for all elements just right of the diagonal.

```
/*------------------------------------------------------------*/
For 1 < = i <= {M × (N−1)}
A(i,i) = 1
A(i,i+1) = −1
End for
/*------------------------------------------------------------*/
/*------------------------------------------------------------*/
For {M × (N−1) + 1} <= i <= {M × (N−1) + N × (M−1)}
column_being_considered = ceil( (i − {M × (N−1)})/(M − 1) )
row_being_considered = mod((i − {M × (N−1)}), (M−1) )
A(i, N × { row_being_considered − 1} +
column_being_considered) = 1
A(i, N × { row_being_considered −1} +
column_being_considered + N) = −1
End for
/*------------------------------------------------------------*/
```

Now, we have the problem set up in the form of a linear least squares. Here, the number of unknowns is (M×N) and the number of equations is (M×(N−1)+N×(M×1)). So we have more equations than unknowns and we use QR decomposition to obtain triangular form of A matrix to solve for X.

Now, in the weighted least squares, we associate weights with each equations. Each equation here considers a dx term ($dx_{LR}$ or $dx_{BT}$): so we associate each dx term with the corresponding NCC based confidence score.

Thus, the final aim is to minimize $J=(D-AX)^TW(D-AX)$;

Hence $X_{opt}=\arg\min_X\{(D-AX)^TW(D-AX)\}$

Where W is a (M×(N−1)+N×(M−1))×(M×(N−1)+N×(M−1)) square matrix with only non-zero diagonal terms;

Where $W(i,i)=\text{conf}_{LR}(\text{ceil}(i/(N-1)),\text{mod}(i,N-1));\ 1<=i\{M\times(N-1)\}$ and for $\{M\times(N-1)+1|\}<=i<=\{M\times(N-1)+N\times(M-1)\}$ $W(i,i)=\text{conf}_{BT}(\text{mod}((i-(M\times(N-1))),M-1),\text{ceil}((i-(M\times(N-1)))/(M-1))).$ Once we solve for $F_x$, we can use a similar weighted least squares based formulation to solve for $F_y$. As mentioned before, the top-left corner of the top-left tile is regarded as the origin.

Hence, all other x-y coordinates are considered with regard to the top-left corner of the top-left tile.

```
/*------------------------------------------------------------*/
originX = Fx(1,1)
originY = Fy(1,1)
For i = 1:M //row index
For j = 1:N //col index
Fx(i,j) = Fx(i,j) − originX
Fy(i,j) = Fy(i,j) − originY
End for // For j = 1:N
End for // For i = 1:M
/*------------------------------------------------------------*/
```

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

This concludes the description of the example embodiments. Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

What is claimed is:

1. A method of stitching tile images of a specimen-bearing slide, the method comprising:
    deriving a greyscale tile image for each tile image of a set of tile images, wherein each tile image of the set of tile images corresponds to a portion within a region of interest of the specimen-bearing slide;
    performing a local registration on the greyscale tile images to estimate a spatial relationship for each pair of pairs of adjacent greyscale tile images, wherein the spatial relationship defines an overlapping region between a corresponding pair of adjacent greyscale tile images, wherein the spatial relationship includes a tile shift value that is estimated based on a normalized cross correlation (NCC) score for a particular image resolution of a set of image resolutions, and wherein the NCC score is computed by using an integral image for the overlapping region at the particular image resolution;
    determining, from the pairs of adjacent greyscale tile images, that a reliability metric derived from a particular pair of adjacent greyscale tile images falls below a predetermined threshold;
    in response to determining that the reliability metric falls below the predetermined threshold, adjusting the tile shift value of the spatial relationship corresponding to the particular pair of adjacent greyscale tile images, thereby generating an adjusted spatial relationship for the particular pair of adjacent greyscale tile images;
    identifying a weighted least squares based on the spatial relationships of the pairs of adjacent greyscale tile images and the adjusted spatial relationship of the particular pair of adjacent greyscale tile images;
    identifying, based on the identified weighted least squares, a position of the each tile image of the set of tile images; and
    generating an output image generated by stitching the each tile image of the set of tile images based on an identified position of the respective tile image.

2. The method of claim 1, wherein the spatial relationship for each pair of adjacent greyscale tile images is further estimated by: (i) computing candidate spatial relationships between prospective matching regions between a first low resolution subsampled image and a second low resolution subsampled image, the first and second low resolution subsampled images derived from the overlapping region of the pair of adjacent greyscale tile images at a low image resolution of the set of image resolutions; (ii) refining the candidate spatial relationships by using an additional pair of subsampled images obtained at a higher image resolution of the set of image resolutions, wherein the higher image resolution is higher relative to the low image resolution; and (iii) selecting the refined candidate spatial relationship for the overlapping region of the pair of adjacent greyscale tile images at an original resolution as the spatial relationship.

3. The method of claim 2, wherein the candidate spatial relationships between the first and second low resolution subsampled images are derived by determining locations of peaks in a NCC domain in the first and second low resolution subsampled images.

4. The method of claim 3, wherein the candidate spatial relationships are retained whose peak locations meet a predefined NCC threshold.

5. The method of claim 2, wherein the candidate spatial relationships are refined by determining updated locations of each peak in a NCC domain in the first and second low resolution subsampled images, wherein updating of the locations of each peak is performed by processing the additional pair of subsampled images, and wherein the additional pair of subsampled images correspond to the overlapping region of the adjacent greyscale tile image pair.

6. The method of claim 5, wherein the additional pair of subsampled images are generated by downsampling the pair of adjacent greyscale tile images by a predetermined down sampling factor.

7. The method of claim 2, wherein the higher image resolution of the additional pair of subsampled images is twice the low image resolution of the first and second low resolution subsampled images.

8. The method of claim 2, further comprising the step of calculating a standard deviation between matching regions in the pairs of adjacent greyscale tile images.

9. The method of claim 1, wherein the spatial relationship includes a corresponding tile overlap and tile shift.

10. The method of claim 1, wherein a pair of the pairs of adjacent greyscale tile images includes horizontal tile image pairs or vertical tile image pairs.

11. The method of claim 1, wherein estimating the spatial relationship further comprises comparing a standard deviation to a threshold value, the standard deviation derived from the overlapping regions in the pairs of adjacent greyscale tile images.

12. The method of claim 1, wherein the spatial relationship comprises a corresponding tile overlap and tile shift, and wherein for a left-right tile image pair of the pairs of adjacent greyscale tile images: (i) a tile overlap is derived for an overlap along an x-axis between a left tile of the left-right tile image pair and a right tile of the left-right image pair; and (ii) a tile shift is derived for shift along a y-axis between the left tile and the right tile.

13. The method of claim 12, further comprising:
    determining that the tile shift corresponds to a positive value; and
    in response to determining that the tile shift correspond to the positive value, shifting the right tile towards a downward direction such that the right tile aligns with the left tile.

14. The method of claim 1, wherein the spatial relationship comprises a corresponding tile overlap and tile shift, and wherein for a top-bottom tile image pair of the pairs of adjacent greyscale tile images: (i) a tile overlap is derived for overlap along a y-axis between a top tile of the top-bottom tile image pair and a bottom tile of the top-bottom tile image pair; and (ii) a tile shift is derived for shift along an x-axis between the top tile and the bottom tile.

15. The method of claim 14, further comprising:
determining that the tile shift corresponds to a positive value; and
in response to determining that the tile shift corresponds to the positive value, shifting the top tile towards a right direction such that the top tile aligns with the bottom tile.

16. The method of claim 1, further comprising performing a region of interest identification.

17. A system comprising:
one or more data processors; and
a non-transitory computer-readable storage medium containing instructions which, when executed on the one or more data processors, cause the one or more data processors to perform part or all of one or more methods comprising:
for each pair of adjacent tile images of a plurality of tile images derived from a specimen-bearing slide:
executing a local registration module to identify matching pixels between the pair of adjacent tile images, wherein:
the matching pixels of the pair of adjacent tile images are identified based on a spatial relationship that includes a tile shift value that yields a highest normalized cross correlation score (NCC) in an overlapping region of the pair of adjacent tile images;
the NCC score corresponds to a particular image resolution of a set of image resolutions; and
the NCC score is computed by using an integral image for the overlapping region at the particular image resolution;
deriving a reliability metric from the pair of adjacent tile images;
determining whether the reliability metric falls below a predetermined threshold;
if the reliability metric falls below the predetermined threshold, adjusting the tile shift value of the spatial relationship corresponding to the pair of adjacent tile images; and
executing a global placement module to position, based on the spatial relationship of the identified matching pixels, a first tile image of the pair of adjacent tile images relative to a second tile image of the pair of adjacent tile images, thereby generating a pair of positioned tile images that correspond to the pair of adjacent tile images; and
executing a stitching module to generate an output image by stitching each pair of the pairs of positioned tile images.

18. The system of claim 17, wherein the spatial relationship for each pair of the adjacent tile images is estimated by: (i) computing candidate spatial relationships between prospective matching regions between a first low resolution subsampled image and a second low resolution subsampled image, the first and second low resolution subsampled images derived from the overlapping region of the pair of adjacent tile images at a low image resolution of the set of image resolutions; (ii) refining the candidate spatial relationships by using an additional pair of subsampled images obtained at a higher image resolution of the set of image resolutions, wherein the higher image resolution is higher relative to the low image resolution; and (iii) selecting the refined candidate spatial relationship for the overlapping region of the pair of adjacent tile images at an original resolution as the spatial relationship.

19. The system of claim 17, wherein the spatial relationship further includes a corresponding tile overlap value.

20. The system of claim 17, wherein a pair of the pairs of adjacent tile images includes horizontal tile image pairs or vertical tile image pairs.

* * * * *